US008693810B2

(12) United States Patent
Suarez et al.

(10) Patent No.: US 8,693,810 B2
(45) Date of Patent: Apr. 8, 2014

(54) OPTICAL COUNTER-PHASE SYSTEM AND METHOD OF RF INTERFERENCE CANCELLATION

(75) Inventors: John Suarez, Princeton, NJ (US); Konstantin Kravtsov, Moscow (RU); Paul R. Prucnal, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 940 days.

(21) Appl. No.: 12/613,512

(22) Filed: Nov. 5, 2009

(65) Prior Publication Data

US 2012/0251031 A1    Oct. 4, 2012

Related U.S. Application Data

(60) Provisional application No. 61/198,336, filed on Nov. 5, 2008.

(51) Int. Cl.
*H04B 10/00*     (2013.01)
*H04B 1/44*      (2006.01)
*H04B 7/005*     (2006.01)
*G02F 1/035*     (2006.01)

(52) U.S. Cl.
USPC ................. 385/3; 370/278; 455/78; 398/116; 398/158; 385/2

(58) Field of Classification Search
USPC ............. 385/2, 3; 370/278; 455/78; 398/116, 398/158
See application file for complete search history.

(56) References Cited

U.S. PATENT DOCUMENTS

| 4,131,343 | A |   | 12/1978 | Shoberg |
|---|---|---|---|---|
| 5,267,188 | A |   | 11/1993 | Pape et al. |
| 5,515,199 | A | * | 5/1996  | Farina .......................... 359/326 |
| 6,175,672 | B1 | * | 1/2001  | Newberg et al. ................ 385/24 |
| 6,594,015 | B1 |   | 7/2003  | Asemyr |
| 6,646,736 | B1 |   | 11/2003 | Asemyr |
| 6,667,829 | B2 |   | 12/2003 | Hatami-Hanza et al. |
| 6,724,840 | B1 |   | 4/2004  | Osofsky et al. |
| 6,754,411 | B2 |   | 6/2004  | Ahmadvand et al. |
| 6,763,155 | B2 |   | 7/2004  | Park et al. |
| 6,768,544 | B1 |   | 7/2004  | Asemyr |

(Continued)

OTHER PUBLICATIONS

J. Capmany, B. Ortega, and D. Pastor, "A Tutorial on Microwave Photonic Filters," Journal of Lightwave Technology, vol. 24, No. 1, Jan. 2006 pp. 201-229.

(Continued)

*Primary Examiner* — Uyen Chau N Le
*Assistant Examiner* — John M Bedtelyon
(74) *Attorney, Agent, or Firm* — Raymond G. Areaux; Ian C. Barras; Carver, Darden, Koretzky, Tessier, Finn, Blossman & Areaux, LLC

(57) ABSTRACT

A system and method for cancellation of RF interference in the optical domain. The system and method utilize two Mach-Zehnder electrooptic modulators biased for parallel counter-phase modulation. The method of signal subtraction is referred to as incoherent optical subtraction, since two independent laser sources serve as the optical carrier waves. The system has produced the broadband cancellation result while simultaneously recovering a 50 dBm signal which was initially "buried" under the broadband interference. The cancellation depths achieved by the system are due to the accurate channel tracking and precise time delays attainable with modern optical devices—unattainable with state-of-the-art electronic devices at the time of this writing.

36 Claims, 12 Drawing Sheets

(56) References Cited

U.S. PATENT DOCUMENTS

| | | | |
|---|---|---|---|
| 6,778,278 B2 | 8/2004 | Ahmadvand et al. | |
| 6,782,152 B2 | 8/2004 | Mohtat et al. | |
| 6,788,716 B2 | 9/2004 | Ahmadvand et al. | |
| 6,794,191 B2 | 9/2004 | Putnam et al. | |
| 6,826,207 B2 | 11/2004 | Xu et al. | |
| 6,900,898 B2 | 5/2005 | Ahmadvand et al. | |
| 6,901,085 B2 | 5/2005 | Hu et al. | |
| 7,016,554 B2 | 3/2006 | Mitchell et al. | |
| 7,058,097 B2 | 6/2006 | Ahmadvand | |
| 7,209,501 B2 | 4/2007 | Xu et al. | |
| 7,262,902 B2 | 8/2007 | Burns et al. | |
| 7,292,196 B2 | 11/2007 | Waterhouse | |
| 7,295,584 B2 | 11/2007 | Ahmadvand et al. | |
| 7,324,268 B2 | 1/2008 | Qiao et al. | |
| 7,359,580 B2* | 4/2008 | Darcie et al. | 385/3 |
| 7,366,244 B2 | 4/2008 | Gebara et al. | |
| 7,369,290 B1 | 5/2008 | Cox et al. | |
| 7,400,787 B2 | 7/2008 | Burns | |
| 7,405,870 B2 | 7/2008 | Qiao et al. | |
| 7,450,077 B2 | 11/2008 | Waterhouse et al. | |
| 7,457,032 B2 | 11/2008 | Qiao et al. | |
| 7,490,998 B2 | 2/2009 | Atieh et al. | |
| 7,555,219 B2 | 6/2009 | Cox et al. | |
| 7,561,803 B2 | 7/2009 | Burns et al. | |
| 7,760,343 B2 | 7/2010 | Roussell et al. | |
| 7,796,898 B2* | 9/2010 | Armstrong | 398/193 |
| 7,809,216 B2 | 10/2010 | Cox, III | |
| 7,826,751 B2 | 11/2010 | Cox et al. | |
| 7,970,241 B2 | 6/2011 | Chen et al. | |
| 8,180,183 B1* | 5/2012 | Yap | 385/2 |
| 8,433,163 B2 | 4/2013 | Cox et al. | |
| 2005/0063035 A1 | 3/2005 | Mitchell et al. | |
| 2006/0083456 A1 | 4/2006 | Burns et al. | |
| 2006/0161225 A1 | 7/2006 | Sormann et al. | |
| 2006/0228065 A1 | 10/2006 | Burns | |
| 2007/0040761 A1 | 2/2007 | Waterhouse | |
| 2007/0046556 A1 | 3/2007 | Waterhouse | |
| 2007/0065147 A1 | 3/2007 | Qiao et al. | |
| 2007/0189778 A1 | 8/2007 | Burns et al. | |
| 2007/0237441 A1 | 10/2007 | Roussell et al. | |
| 2007/0285324 A1 | 12/2007 | Waterhouse et al. | |
| 2007/0297044 A1 | 12/2007 | Qiao et al. | |
| 2008/0181612 A1 | 7/2008 | Mills et al. | |
| 2008/0181615 A1 | 7/2008 | Atieh et al. | |
| 2008/0193124 A1 | 8/2008 | Atieh et al. | |
| 2008/0227410 A1 | 9/2008 | Cox | |
| 2009/0060412 A1 | 3/2009 | Chen et al. | |
| 2009/0067771 A1 | 3/2009 | Chen et al. | |
| 2009/0247074 A1 | 10/2009 | Cox et al. | |
| 2009/0263081 A1 | 10/2009 | Cox et al. | |
| 2009/0274466 A1 | 11/2009 | Cox et al. | |
| 2010/0189439 A1 | 7/2010 | Novak et al. | |
| 2011/0287720 A1* | 11/2011 | Cox et al. | 455/63.1 |

OTHER PUBLICATIONS

J. Capmany, D. Pastor, B. Ortega, J. Mora and M. Andrés, "Photonic processing of microwave signals," IEEE Proc. Optoelectron., vol. 152, No. 6, pp. 299-320 (Dec. 2005).

B. Ortega, D. Pastor, J. Mora, J. Capmany and M. Andre's, "Advanced Optical Processing of Microwave Signals," EURASIP J. Appl. Signal Process, vol. 10 pp. 1462-1484.

A. Sonnenschein and W. K. Hutchinson, "A Design for an Electro-Optic Implementation of a Wideband Nulling System," MIT Lincoln Lab. Tech. Rep. 887, 1990.

\* cited by examiner

OPTICAL COUNTER-PHASE SYSTEM AND METHOD OF RF INTERFERENCE CANCELLATION

CROSS-REFERENCE TO RELATED APPLICATIONS

The present application claims the benefit of the filing date of U.S. Provisional Patent Application Ser. No. 61/198,336 filed by the present inventors on Nov. 5, 2008.

The aforementioned provisional patent application is hereby incorporated by reference in its entirety.

STATEMENT REGARDING FEDERALLY SPONSORED RESEARCH OR DEVELOPMENT

This invention was made with government support under Prime Contract W911NF-07-D-0001 (Subcontract TCN: 08-004) awarded by the Department of the Army. The government has certain rights in the invention.

BACKGROUND OF THE INVENTION

1. Field of the Invention

The present invention relates to systems and methods for interference cancellation, and more specifically, the use of optical techniques in systems and methods for interference cancellation.

2. Brief Description of the Related Art

Radio-frequency (RF) and microwave signals are commonly employed in wireless communications due to their desirable propagation characteristics. To minimize losses and distortion, systems often transmit the signals at higher power levels to minimize the losses and distortion that may result. At the receiving end, the signals are inevitably received at power levels significantly lower than the power levels used for transmission. If a transmitter and receiver are co-located, this can cause significant difficulties because the transmitted signal can interfere with the desired received signal and in some cases may overpower the received signal such that it is buried under the locally transmitted signal.

A variety of electronic methods for interference cancellation have been developed and currently are in use. For example, U.S. Pat. No. 6,724,840 entitled "Adaptive Interference Cancellation Method" discusses the design and performance of an analog cancellation system. The system generates either narrow or wideband nulls in order to minimize the effect of interfering signals on a receiver. A microcontroller directs the detection and classification of the interfering signal relative to frequency, amplitude and modulation, such as pulse-width or continuous wave modulation. A sampled version of the interfering signal at frequency, fi, is phase-inverted, amplified, and vector-summed with the input signal stream to null the interfering signal at fi. The microcontroller also monitors and adjusts the cancellation system's circuit parameters to minimize any residual interfering signal at fi or respond to changes in the interference. In another example, U.S. Pat. No. 7,366,244 discloses a cancellation device that attempts to suppress antenna interference by generating an estimate of the interference signal and subtracting the estimate from the interference signal. The cancellation device can generate the estimate based on sampling signals on an antenna that generates the interference or on an antenna that receives the interference. The cancellation device can comprise a model of the crosstalk effect. Transmitting test signals on the communication system can define or refine the model.

SUMMARY OF THE INVENTION

In a preferred embodiment, the present invention is a system and method for cancellation of RF interference in the optical domain. The system and method utilize two electrooptic modulators biased for parallel counter-phase modulation. In a preferred embodiment, interferometric electrooptic modulators are used, and more specifically, Mach-Zehnder electro-optic modulators are used. The method of signal subtraction may be referred to as incoherent optical subtraction, since two independent laser sources serve as the optical carrier waves. The system has produced the broadband cancellation result while simultaneously recovering a 50 dBm signal which was initially "buried" under the broadband interference. The cancellation depths achieved by the system are due to the accurate channel tracking and precise time delays attainable with modern optical devices—unattainable with current state-of-the-art electronic devices. The system is useful in the context of wireless radio communications because it can increase the dynamic range of a receiver by allowing it to receive weaker signals, even when a much stronger signal is being transmitted in close proximity. For those cases in which the transmitted signal is especially strong and may otherwise saturate the receiver, the system provides a benefit by reducing the transmitted signal significantly.

In a preferred embodiment, the present invention is an interference cancellation system. The system comprises a first electro-optic modulator for receiving a first signal, a second electro-optic modulator for receiving a second signal together with the first signal, the first and second electro-optic modulators being biased for parallel counter-phase modulation, an optical attenuator connected to the second electro-optic modulator, an optical delay connected to the second electro-optic modulator, and an optical coupler connected to the first and second electro-optic modulators, the second electro-optic modulator being connected to the optical coupler through the optical attenuator and the optical delay. The optical delay may be connected to the second opto-electric modulator through the optical attenuator or vice versa. The system further may comprise a control subsystem for automatically controlling the optical attenuator and/or the optical delay. The control subsystem may comprise an open loop or closed loop control subsystem, including but not limited to a dither method closed loop control subsystem or a parameter offset closed loop control subsystem.

In another embodiment, the present invention is an interference mitigation system for recovering a weak signal at a location in close proximity to a transmitter that is transmitting a strong signal. The system comprises a splitter having an output connected to an optical cancellation system for providing the strong signal to the optical cancellation system, a receiver for receiving the weak signal, the receiver having an output connected to the optical cancellation system, and an optical cancellation system. The optical cancellation system comprises a first electro-optic modulator for modulating the strong signal received from the splitter, a combiner for combining the strong signal received from the splitter and the weak signal received from the receiver into a combined signal, a second electro-optic modulator for modulating the combined signal, the first and second electro-optic modulators being biased for parallel counter-phase modulation, an optical attenuator connected to the second electro-optic modulator, an optical delay connected to the second electro-optic modulator, and an optical coupler connected to the first and second electro-optic modulators, the second electro-optic modulator being connected to the optical coupler through the optical attenuator and the optical delay.

In another preferred embodiment, the present invention is a method for mitigating interference with a signal. The method comprises the steps of receiving a signal comprised of a desired signal and a known interfering signal, inputting the received signal to a first electro-optic modulator, inputting the known interfering signal to a second electro-optic modulator, and combining outputs from said first electro-optic modulator and said second electro-optic modulator in a combiner. The method may further comprise fine-tuning the mitigation by adjusting an optical attenuator and an optical delay connected to the second electro-optic modulator.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 1:
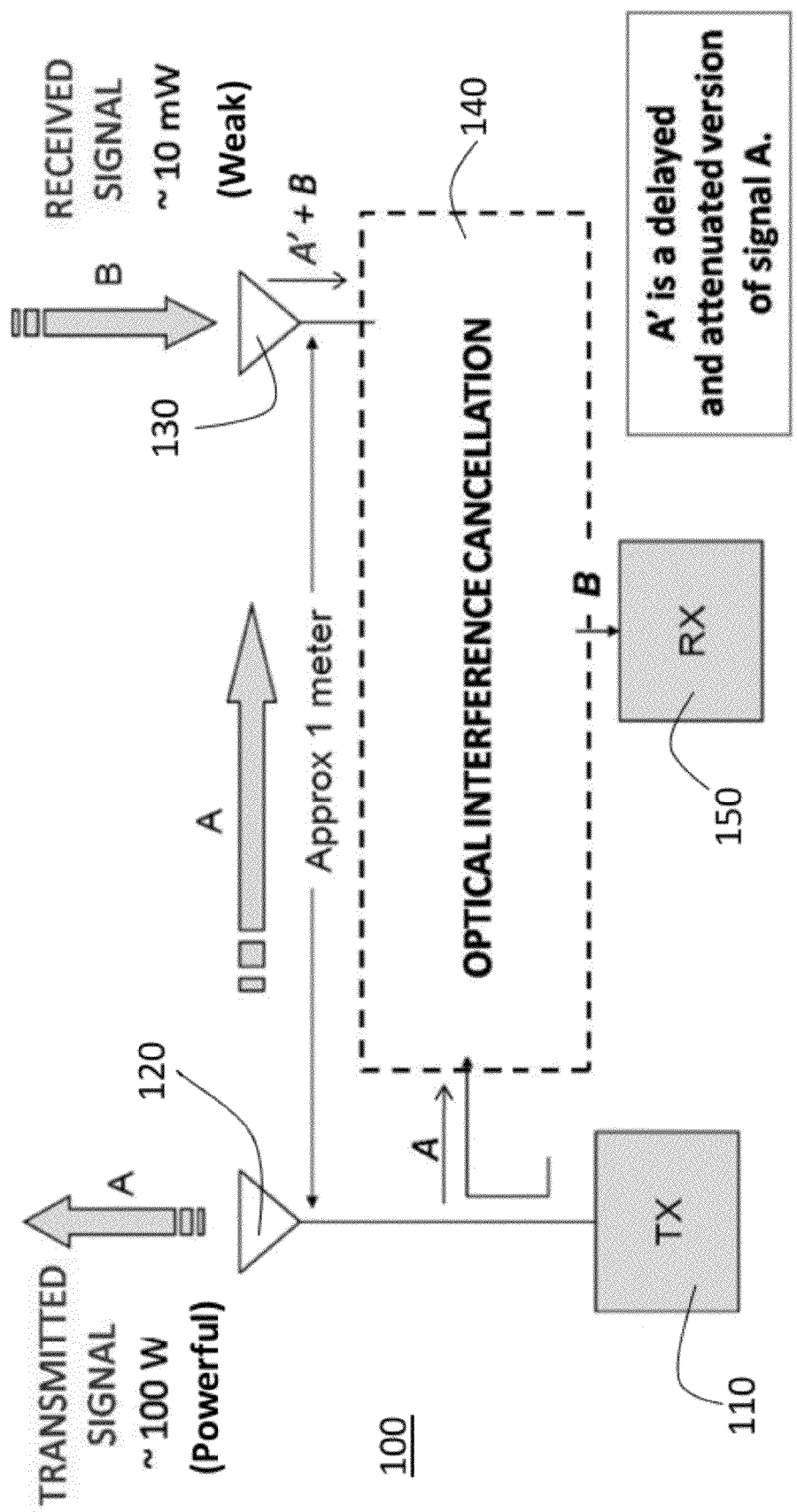
FIG. 1 is a block diagram illustrating the interference cancellation problem to which a preferred embodiment of the present invention is directed.

The present invention employs new systems and methods of optical processing to address problems associated with interfering signals. The general problem is described with reference to system 100 shown in FIG. 1. A transmitting antenna 120, which is connected to a transmitter 110, and receiving antenna 130 are separated by approximately 1 m. The transmitting antenna 120 emits RF radiation whose power is of the order of 100 W, while the power of the received signal (measured at the output of the receiving antenna 130) is of the order of 1 W. The received signal is comprised of both a desired signal and a delayed-and-attenuated replica of the transmitted signal. From the standpoint of the receiver 150, one may consider the transmitted signal to be additive noise which undesirably combines with the desired signal.

To address this problem, a preferred embodiment of the present invention is an optical interference cancellation system 140 and method that accepts a received signal and the transmitted signal as separate inputs, converts both of these inputs to optical signals, inverts the transmitted signal, and combines (adds) the two signals. This effectively cancels the transmitted signal, yielding only the desired component of the received signal as output. Conversion of this optical output to an electrical signal is performed by means of a lightwave converter module.

The present invention uses optical methods to perform signal cancellation to produce extremely accurate channel tracking between any two parallel components in the system and to obtain precise time delays. See, A. Sonnenschein and W. K. Hutchinson, "A Design for an Electro-Optic Implementation of a Wideband Nulling System," MIT Lincoln Lab. Tech. Rep. 887, 1990; B. Ortega, D. Pastor, J. Mora, J. Capmany and M. Andre's, "Advanced optical processing of microwave signals," EURASIP J. Appl. Signal Process., vol. 10, pp. 1462-1484 (2005); and J. Capmany, D. Pastor, B. Ortega, J. Mora and M. Andre's, "Photonic processing of microwave signals," IEEE Proc. Optoelectron., vol. 152, no. 6, pp. 299-320 (December 2005).

For perfect cancellation, a signal must be split into two replicas that are precisely equal. One of these replicas is inverted and then combined with the non-inverted replica. The depth of cancellation depends on the equality of the two replicas. However, when an optical carrier is modulated by an RF signal, the fractional bandwidth is small; and accurate channel tracking can be achieved. In this way, equality between the two signal replicas can be more closely realized that it can be with current state-of-the-art electrical components.

A precise time-delay mechanism also is necessary for a perfect solution to the signal-cancellation problem, since ultimately the two signal replicas must be accurately "aligned" in time so that peaks and troughs cancel precisely. It is important to reiterate that for a perfect solution the only difference between the two signal replicas must be an exact inversion—they must be identical in every other respect, and that equality must be maintained prior to the addition of the signals. Accurate channel tracking can be obtained in two different ways: (1) preserving the integrity of the RF signal, or (2) degrading the RF signal in equal amounts. These are the only ways one can ensure that identical signals emerge from the two channels. Since all devices present some type of degradation to a signal—which may be in the form of attenuation, the addition of noise, and/or the addition of spurious frequency components due to nonlinearities—the second option for channel tracking is used in a preferred embodiment. That is, the present invention achieves accurate channel tracking when the devices in one channel degrade the signal as much as the devices in the other channel. This requirement is met closely when: 1) the constituent devices in each channel are equal—where this equality holds true over the entire region of operation of the devices and 2) the components have small fractional bandwidths—the smaller the better. The system and method of the present invention performs such functions, capable of achieving desirable cancellation depth while simultaneously recovering a weak, desired signal. While prior electronic methods have provided cancellation of approximately 40 dB, examples of the present invention achieved cancellation exceeding 70 dB.

Figure 2:
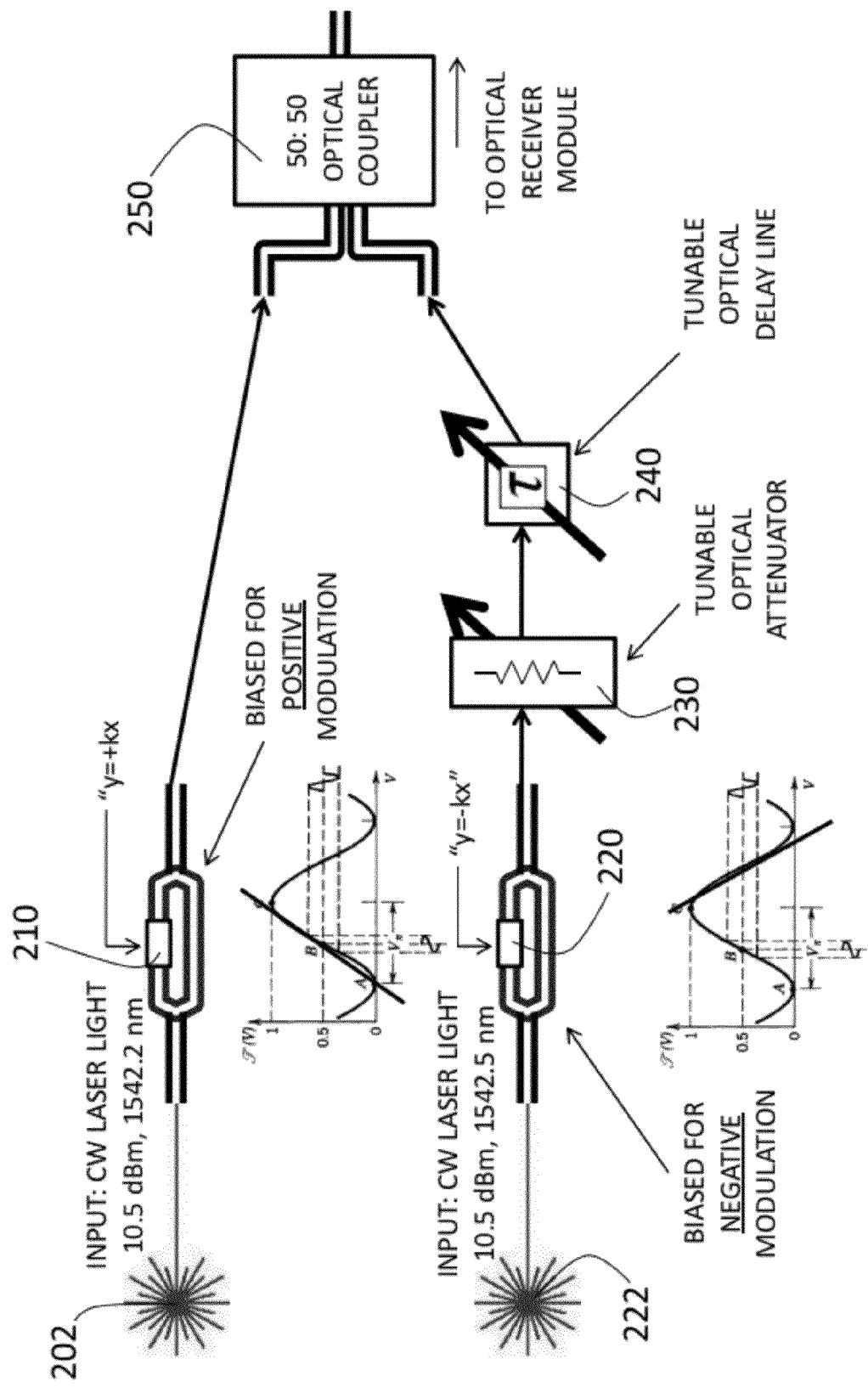
FIG. 2 is a block diagram illustrating basic principles of the operation of a preferred embodiment of an optical cancellation system in accordance with the present invention.
Figure 3:
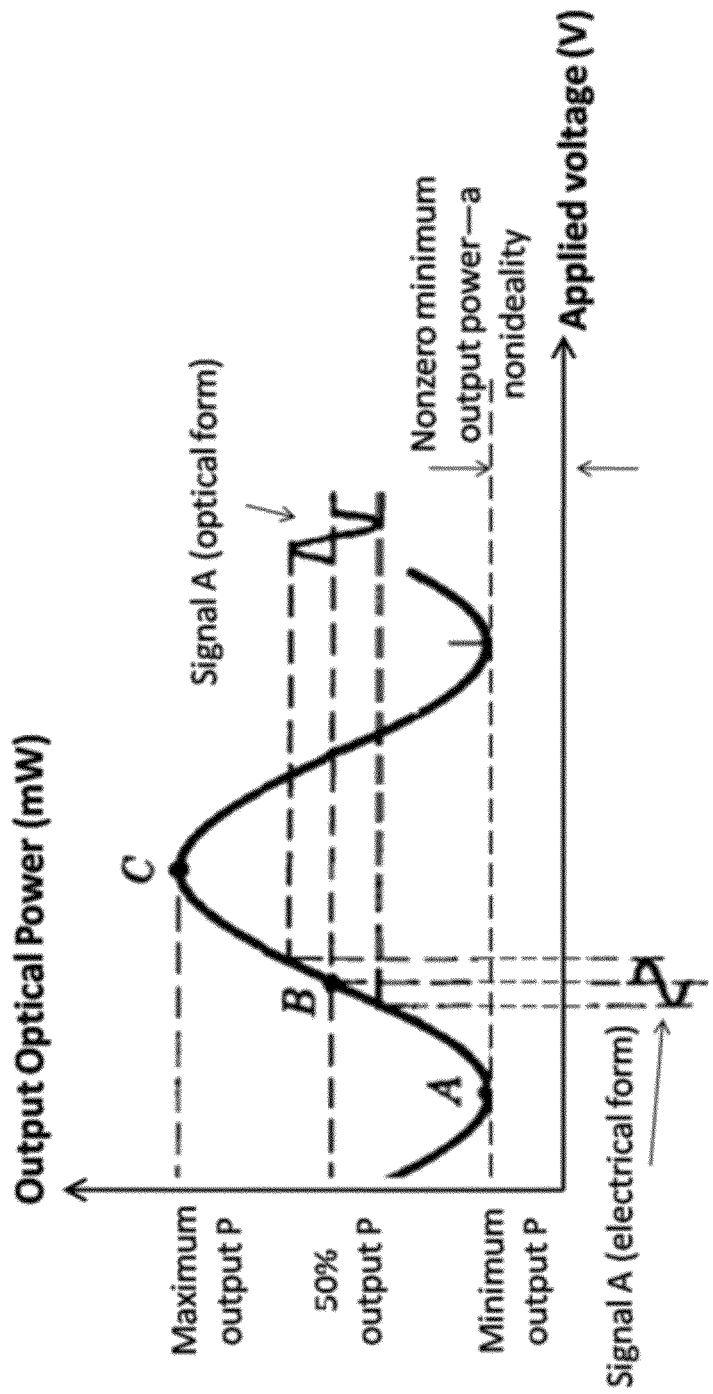
FIG. 3 is a graph illustrating transmittance characteristics of a Mach-Zehnder electrooptic modulator in a preferred embodiment of the present invention.

The general principles of operation of the present invention are described with reference to FIG. 2. For purposes of description herein, the strong signal described above in the signal cancellation problem will be referred to as the "interfering signal" and the weak signal the system is attempting to receive will be referred to as the "desired signal." As shown in FIG. 2, the optical cancellation system utilizes two CW lasers 202, 222 providing a power of 10.5 dBm at wavelengths 1542.20 and 1542.50 nm, respectively. The lasers 202, 222 are isolated from each other, and serve as optical inputs to two Ti:LiNbO Mach-Zehnder electrooptic modulators 210, 220. It is well-understood that the transmittance curve of a Mach-Zehnder modulator follows a squared-cosine dependence, as shown in FIG. 3. The Mach-Zehnder modulator may be biased anywhere (within reasonable voltage limits) on its transmittance curve. As shown in FIG. 2, modulator 210 is biased such that its operating point lies in a region of increasing transmittance. Modulator 220 is biased such that its operating point lies in a region of decreasing transmittance. These two cases may be referred to as "positive quadrature modulation and negative quadrature modulation," respectively. Collectively, this biasing arrangement may be referred to as "parallel counter-phase modulation." The output of the modulator 220 is connected to a tunable optical attenuator 230 and a tunable optical delay line 240. The output of the tunable optical delay line 240 and the output of modulator 210 are connected to a 50:50 optical coupler 250.

Figure 4:
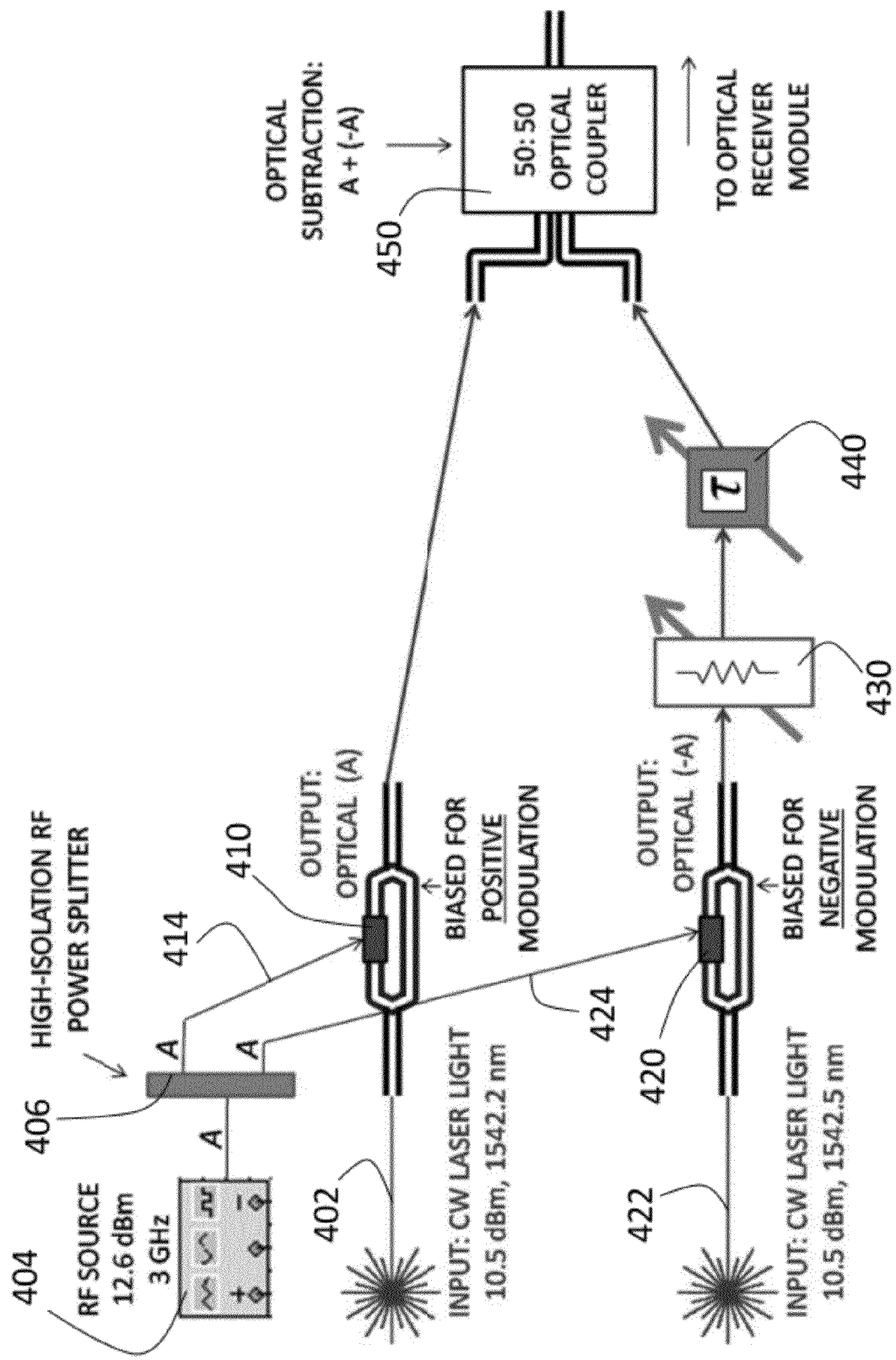
FIG. 4 is a block diagram illustrating an exemplary embodiment of the present invention performing cancellation of a simple sinusoid.

FIG. 4 shows a schematic of a first example demonstrating the invention. In the first example, a signal generator 404 provides signal A to high resolution RF power splitter 406, which splits signal A into two approximately-equal "replicas." The replicas are used in place of actual antennas for purposes of demonstration. One of these replicas is sent as input 414 into the top Mach-Zehnder modulator 410 and undergoes positive modulation, while the other replica is sent as input 424 into the bottom Mach-Zehnder modulator 420 and undergoes negative modulation. Lasers 402, 422 are isolated from one another and serve as optical inputs to the modulators 410, 420. The outputs of both modulators ultimately are fed into a 50:50 optical-fiber combiner 450, whose output power varies as (A)+−A)=0. This subtraction method may be referred to as incoherent optical subtraction. Note that the effective inversion of signal A results because the bottom Mach-Zehnder modulator 420 is biased to perform negative modulation. The setup also utilizes an optical attenuator 430 and an optical delay line 440, positioned before the 50:50 optical-fiber combiner 450, allowing the incoherent subtraction to be fine-tuned. This experimental setup demonstrates the invention's ability effectively cancel a simple sinusoidal signal.

The signal generator 404 first was set to a power level of 12.6 dBm and a frequency of 3 GHz. The output was observed with the bottom optical path disabled and then enabled. As used herein, "disabling the bottom optical path" refers to disabling the tunable optical attenuator 430 so that no light passes from the bottom optical modulator 420 to the optical fiber combiner 450. Effectively, this yields a maximum of power at the output of the system, since the output of the bottom modulator 420 (inverted signal A) does not subtract from the output of the top modulator 410 (noninverted signal A). The maximum, at a peak at 3 GHz, had a value of 13.16 dBm. After noting the value of this maximum, the tunable optical attenuator 430 was then enabled, and the peak dropped significantly. However, the peak did not fall to the level of the noise floor. This was expected to be the case, since it is known that mismatches in the RF power splitter 406 and coaxial cables lead to unequal splitting of signal A. As a result, slightly different RF inputs are presented to the two electrooptic modulators 410, 420, leading to imperfect cancellation. The difference in the two RF inputs may be due to attenuation of one RF input signal that is uncompensated in the other RF input signal, or a time delay experienced by one RF input signal and not the other. To mitigate these effects, fine tuning in the optical domain is performed using the tunable optical attenuator 430 and tunable optical delay line 440. These two instruments were manually tuned until a minimum of power at 3 GHz was obtained. This minimum value was observed to be 86.16 dBm. "Optical cancellation" as used herein refers to the cancellation of signal A provided solely by the optical components of the system. To compute the optical cancellation, consider the aforementioned maximum value (13.16 dBm) minus the minimum value (86.16 dBm). The optical cancellation is the absolute value of this difference, which is 73 dB in the case of this example.

Figure 5:
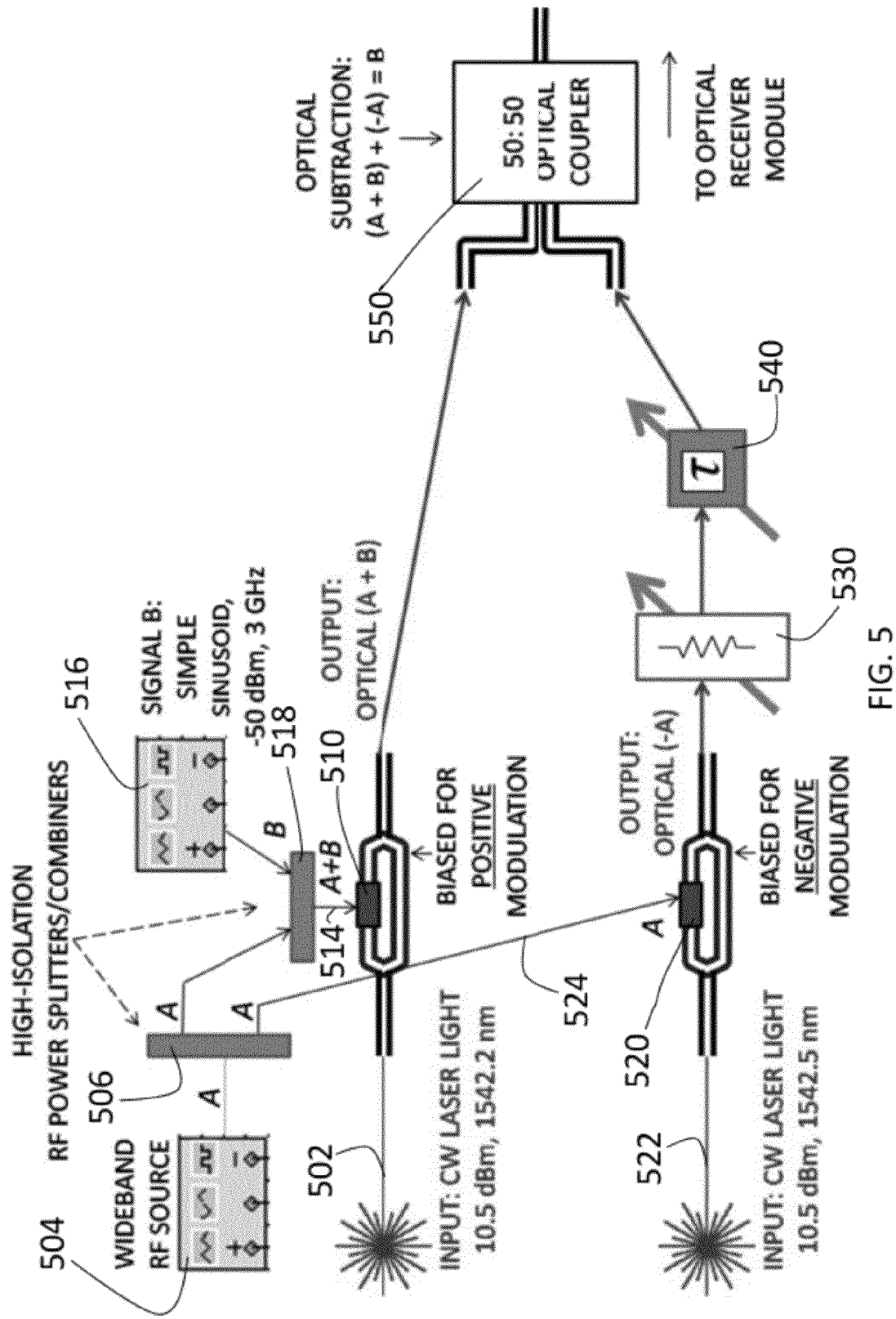
FIG. 5 is a block diagram illustrating an exemplary embodiment of the present invention performing cancellation of a broadband interferer.

In the second example, a second signal generator 516 is connected to the setup, as shown in FIG. 5. The purpose of the second signal generator 516 was to generate the weak, desired signal B that is to be recovered from the interfering signal A. As shown in FIG. 5, a high-isolation RF power combiner 518 was used to combine the output of signal generator 504 with that of signal generator 16, so that the net input 514 to the top electrooptic modulator 510 is the sum of signals A and B. Note that the input 524 to the bottom electrooptic modulator 520 remains unchanged. As in the prior example, the outputs of the electrooptic modulators 510, 520 are connected to a 50:50 combiner 550. Lasers 502, 522 again are isolated from one another and serve as optical inputs to the modulators 510, 520. In this example, signal generator 504 was adjusted to generate a wide-band (96-MHz), additive-white Gaussian-noise (AWGN) signal of 8-dBm power, centered at 3 GHz. Signal generator 516 was adjusted to generate a 50 dBm sinusoid at 3 GHz.

The system output first was observed when the bottom optical path was been disabled. The wideband AWGN signal observed on the spectrum analyzer screen was the interfering signal A. Signal B could not be seen—it was effectively "buried" by the overpowering interference. The maximum value of signal A was seen to be 42.30 dBm. After noting these values, the bottom optical path was enabled again, and the optical attenuator 530 and delay 540 were adjusted as previously described. The minimum value was seen to be 75.78 dBm. The cancellation value is the absolute value of the difference: |(−75.78 dBm)−(−42.30 dBm)|=−33.48 dB across the 96-MHz bandwidth of the signal. The cancellation value is not as high as that for the sinusoidal case, but this is due to the lower value of the maximum power—the 8-dBm power level from the signal generator is spread over a 96-MHz bandwidth (as recorded on the spectrum analyzer, set to a 100-kHz resolution bandwidth).

Figure 6:
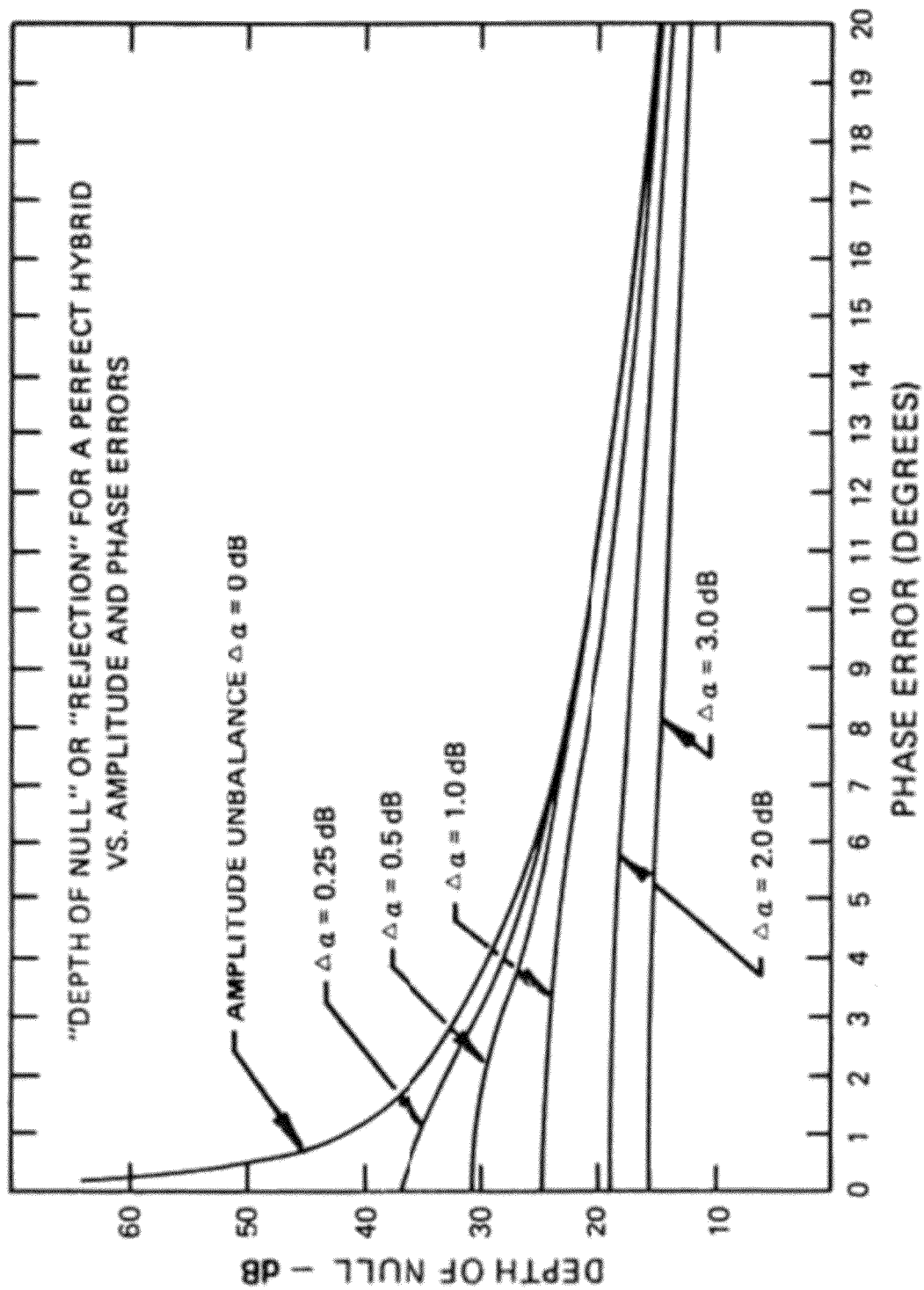
FIG. 6 is a graph illustrating depth of a null from the output of a hybrid coupler, plotted against amplitude and phase error.
Figure 8:
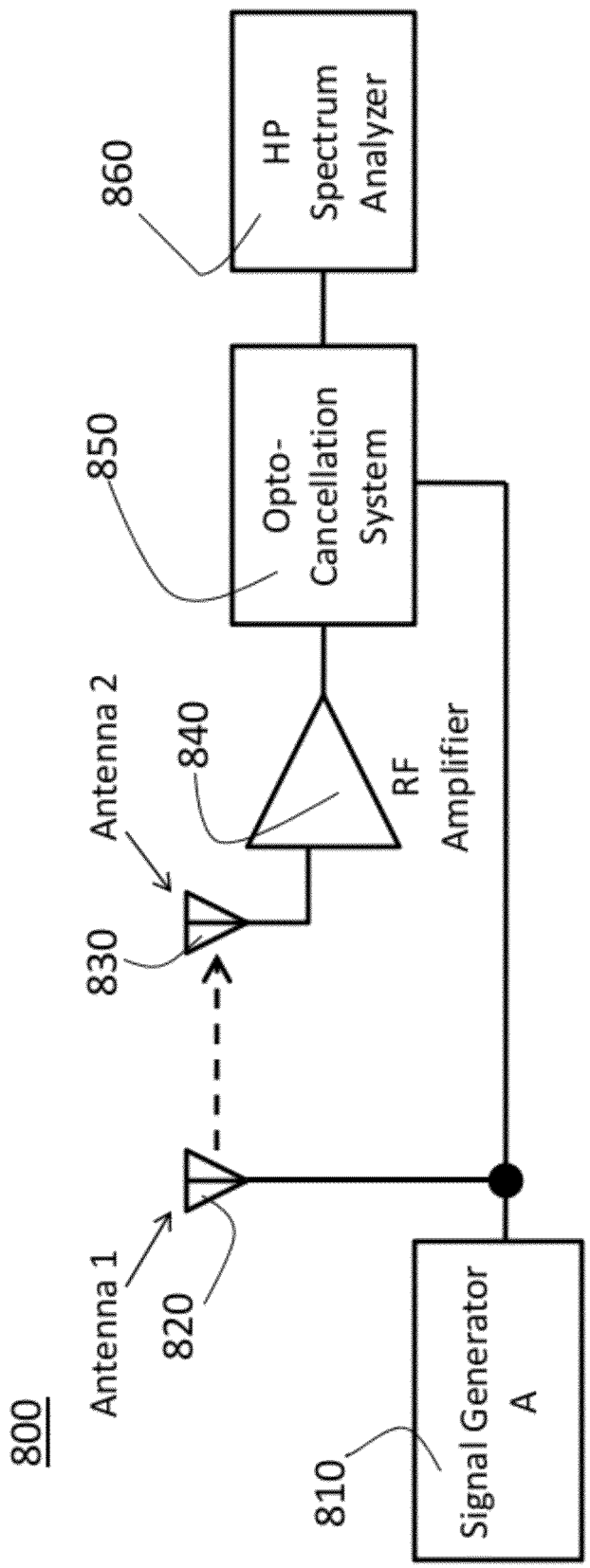
FIG. 8 is a diagram of an experimental setup used in an example showing optical cancellation in accordance with the present invention.

The above examples have shown that the optical cancellation system and method of the present invention provides over 30 dB of cancellation over a bandwidth of 100 MHz. For sinusoidal signals, the system and method have provided cancellation over 70 dB, and have done so for sinusoids in the range of 50 MHz-6 GHz. For purposes of comparison, it may be beneficial to consider what would be required to reproduce this result using electronic methods. As an example, consider a microwave hybrid coupler. Suppose the two input ports of the coupler were loaded with an identically-split signal, with the purpose of obtaining a null at one of the output ports. This null is interpreted as cancellation of the input signal. For effective cancellation of a signal, it is imperative that the signal is split into two replicas that are precisely equal, except for an exact relative inversion between them. In practice, it is difficult to maintain these equalities. There will be an imbalance in the amplitudes and relative phase difference of the signals due to slight differences in the two propagation paths. These imbalances are referred to as amplitude error and phase error, respectively. FIG. 6 illustrates how the cancellation depth at the output of the hybrid coupler depends on the amplitude error and phase error between the two signals. Each curve corresponds to a constant value of amplitude imbalance dB, 0.25 dB, 0.5 dB, etc.). According to the figure, to achieve 30 dB of cancellation, for example, the amplitudes of the two signals must be balanced to within 0.5 dB and the relative phase difference cannot deviate (from 180 degrees) by more than 2 degrees. For cancellation of 60 dB, the requirements are even more stringent—the amplitude error must be 0 dB and the phase error must be less than half a degree. Such requirements can be met more readily with the optical cancellation system and method of the present invention, since optical attenuators provide reliable amplitude adjustment over a broad range of frequencies, and extremely precise phase shifts (time delays) are possible using optical delay lines. In fact, modern optical delay lines can provide time delays with femtosecond resolution. For example, consider 60-dB cancellation of a 3-GHz sinusoid. FIG. 8 shows that, in order to achieve this depth of cancellation, the phase error must be less than half a degree. At 3 GHz, 0.5 corresponds to m. Using the speed of light in free space m/s, this corresponds to a time delay of 0.4633 ps. Such a time-delay resolution can be readily obtained with an optical delay line, as evidenced by the cancellation examples discussed above. However, the system and method only need to produce relatively short time delays with the optical cancellation method of the present invention. This is because the parallel counter-phase modulation technique provides the necessary relative inversion between the two RF signals, as they modulate their respective optical carrier waves. The optical delay line is in fact a corrective measure—it is a means of "correcting" any phase error that may have accumulated as the signals traverse their respective paths, both in the RF (coaxial) cables, and the optical fibers. And, this correction is accurate and stable across an extremely wide (terahertz) bandwidth.

As discussed above, the cancellation system and method of the present invention exhibits "accurate channel tracking" of the system. In a preferred embodiment, each optical propagation path (i.e., channel) in the optical cancellation system is comprised of a Mach-Zehnder electrooptic modulator and optical fiber. The two electrooptic modulators are biased for operation in their linear regions and appear as identical devices from the perspective of an impinging signal. This equality holds true over the entire linear regions of both electrooptic modulators. It can be shown that the half-wave voltage parameter can be used to characterize the linear region of a Mach-Zehnder electrooptic modulator. In essence, equal half-wave voltages mean equal linear regions. However, because it is difficult to fabricate Mach-Zehnder modulators with precisely equal half-wave voltages, the preferred embodiments of the invention may have a slight difference between the half-wave voltages of the two modulators. In a preferred embodiment of the invention, the half-wave voltages are 7 V for the top modulator and 6 V for the bottom modulator. With this 1-V mismatch, it has been experimentally demonstrated that over 60 dB of signal cancellation is possible. From such results, one can conclude that matching of the half-wave voltages to within 1 V is sufficient to reduce the interfering signal to the level of the noise floor (75.78 dBm). The linearity of the two electrooptic modulators is important because a higher linearity lessens the appearance of spurious nonlinear components in the modulators' respective output signals. However, the attenuation provided by the modulators (in the form of insertion loses) is also an important factor. In addition, the noise presented by the system imposes a minimum-required input RF signal power for proper operation.

Figure 7:
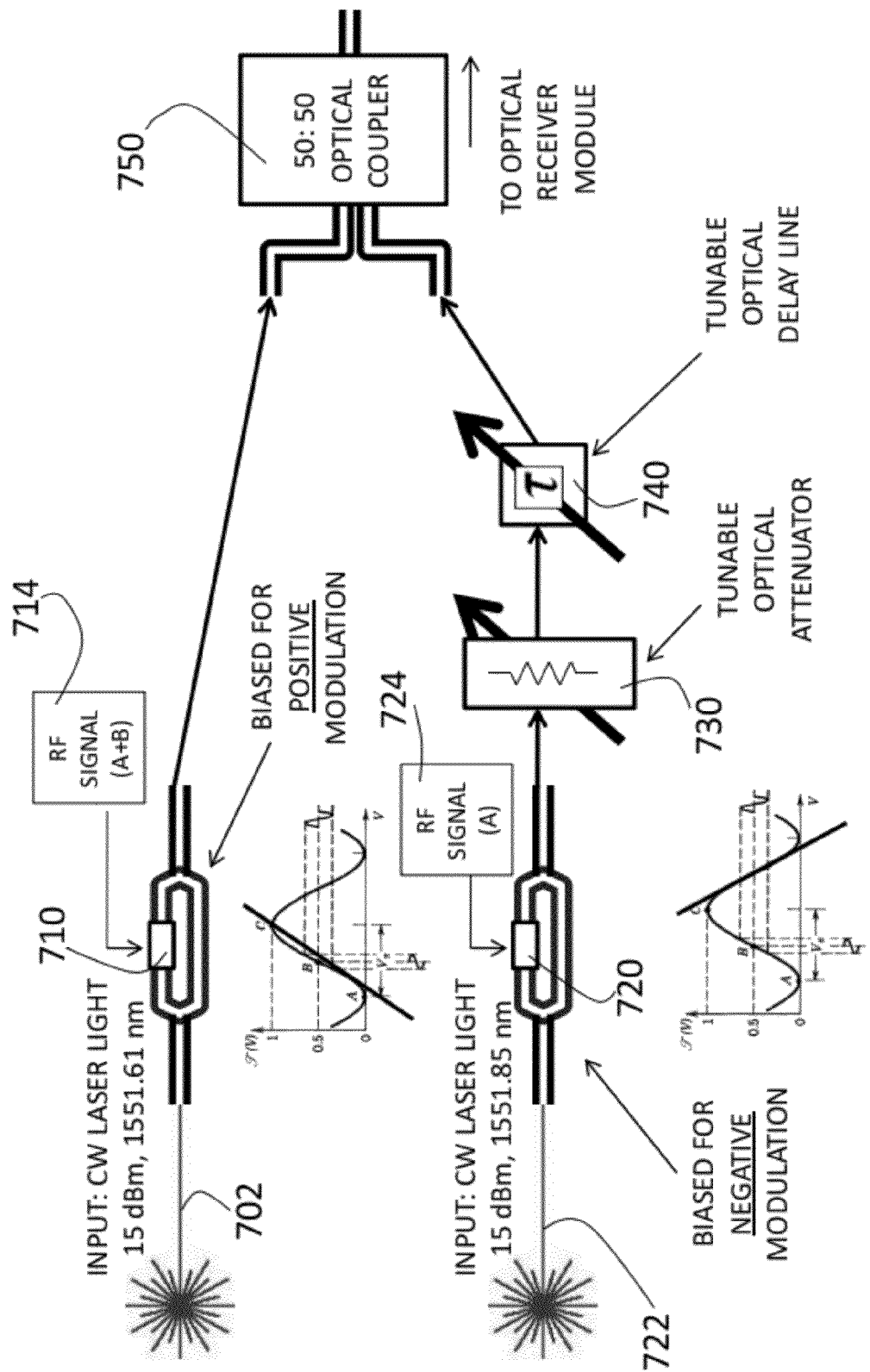
FIG. 7 is a block diagram illustrating a preferred embodiment of a counter-phase optical cancellation system in accordance with the present invention.

FIG. 7 shows a conceptual schematic of another embodiment of a counter-phase optical interference-cancellation system in accordance with the present invention. The system has two CW (continuous-wave) lasers 702, 722 providing a power of 15 dBm at wavelengths 1551.61 nm and 1551.85 nm, respectively. The lasers 702, 722 are isolated from each other, and serve as optical inputs to two Ti:LiNbO3 Mach-Zehnder electro-optic modulators 710, 720. Now, it is well-understood that the transmittance characteristic of a Mach-Zehnder electro-optic modulator follows a squared cosine dependence with respect to voltage. As in the examples discussed above, the Mach-Zehnder electro-optic modulators 710, 720 may be biased anywhere (within reasonable voltage limits) on its transmittance curve. In this embodiment, the top modulator 710 is biased such that its operating point lies in a region of increasing transmittance while the bottom modulator 720 is biased such that its operating point lies in a region of decreasing transmittance. Both of these bias points correspond to 50% transmittance. The technique is schematically represented, in general terms, in FIG. 7. It is important to realize that the RF signals are inverted relative to each other, immediately "upon arrival" into the system, by the counter-phase biasing of the electro-optic modulators 710, 720. The optical attenuator 730 and optical delay line 740 shown in FIG. 7 are for fine-tuning the cancellation. Unlike RF or microwave cancellation systems which are restricted in their operational bandwidth, the optical cancellation system of the present invention is potentially applicable over the entire RF and microwave frequency bands (10 kHz-100 GHz). The only components to be replaced, according to the operational frequency, are external to the optical cancellation system: these are the front-end and back-end, consisting of the RF preamplifier and RF post-amplifier, respectively. Still, the optical cancellation system's broadband character allows it to be applied independent of the RF front-end and back-end used for a particular application. That is, a separate integrated circuit technology would not be required for applications at 200 MHz, 1 GHz, and 20 GHz—the optical cancellation system would provide the same cancellation capability at each of these frequencies.

The performance of the optical cancellation system has been demonstrated in several examples, which were carried out using two basic types of signals over a wide range of frequencies. FIG. 8 shows the experimental setup 800 used in this set of examples. In all these examples, an Agilent E8267D 250 kHz-20 GHz PSG vector signal generator 810 was used to generate a "jamming," "interfering" or "offending" signal, which we will refer to as signal A. The output of signal generator 810 was split, using a resistive RF/MW power splitter (not shown), into two outputs. One of these was connected to the optical cancellation system 850 as an input. The other output of signal generator 810 was connected to an extendable-dipole antenna 820, so that signal A could be broadcast over the air. A receiving antenna 830 was connected through the RF amplifier 840 to the optical cancellation system's other RF input. Here, the system's performance was measured as the ability to reduce signal A, according to the formula $$\text{Cancellation depth} = |P_1(\text{in dBm}) - P_2(\text{in dBm})| \quad (1)$$

where P1 is the maximum RF power level appearing on the HP spectrum analyzer 860 when the bottom optical path of the optical cancellation system (shown in FIG. 7) was disabled. To cancel signal A, the bottom optical path was enabled and the optical attenuation and optical delay were adjusted until a minimum of RF power was attained. P2 is this minimum power level, displayed on the HP spectrum analyzer. This can be visualized by referring to FIG. 7; but remember that signal B (in the top optical path) is not present. Referring to FIG. 7, notice that if the bottom optical path is disabled, then the received signal A passes to the output of the system unobstructed, effectively yielding a maximum power value of signal A. This is the maximum value P1 that is compared with the cancelled (minimum) value P2.

From the above example, it is apparent that the optical cancellation system and method of the present invention is capable of cancelling narrowband signals over a wide range of frequencies. Consider now whether this may be the best possible cancellation of a narrowband signal that can be achieved with the optical cancellation system. ii is important to note that the value of cancellation depends not only on the minimum value of RF power given by P2 in Equation 1, but also the maximum value of RF power given by P1 in that same equation. To that end, a sinusoidal signal at 2.48 GHz was selected for this example. This value of frequency was chosen because the resonant frequency of the receiving antenna was 2.48 GHz, and therefore impedance mismatch-related losses would be minimized by using a signal at this resonant frequency. However, it was realized that an impedance mismatch would still be present between the antennas, since the resonant frequency of the transmitting antenna was between 88 MHz and 900 MHz. The power level of signal generator 810 was set to 16 dBm. This signal was broadcast over the air. A maximum power value of −27.65 dBm was then noted on the HP spectrum analyzer 860. This maximum value of signal A, obtained by disabling the bottom optical path, illustrates the losses experienced by the signal due to the impedance mismatch between the antennas, over-the-air propagation losses, and system losses.

Cancellation of signal A was achieved by adjusting the optical attenuation and optical delay, until a minimum of power was obtained. This minimum was −110.18 dBm. With P1=−27.65 dBm and P2=−110.18 dBm, the cancellation depth is 82.53 dB, according to Equation 1. Because of multipath propagation effects, there were fluctuations in these values (by as much as 6 dB) when there was movement around the experimental setup. To obtain these and all other power values, no movement around the experimental setup was permitted for approximately one minute prior to the recording of data. This allowed recordation of stable values of power from the HP spectrum analyzer.

While in the above-examples an optical attenuator and optical delay are shown only in the bottom path, the top path similarly may have an optical attenuator and/or optical delay to assist in fine-tuning the system. Similarly, the laser wavelengths used in the examples are merely exemplary, as different wavelengths—closer together or further apart—may be used with the present invention. Wavelengths further apart than those described in the examples may improve the performance of the invention. Further, lasers having the same wavelength could be used with the present invention.

B. Broadband Signal Cancellation

It is useful to determine whether the optical cancellation system can cancel a signal of finite bandwidth. For this example, an AWGN signal of 80-MHz bandwidth was employed. Initially, signal generator 810 was set to a produce an AWGN signal of 10 dBm power and 2.48 GHz center frequency. This signal was broadcast over the air, and a maximum of −67.50 dBm was noted on the HP spectrum analyzer. Cancellation was then achieved by adjusting the optical attenuation and optical delay, resulting in the minimum value of −95.48 dBm.

According to Equation 1, the system has provided cancellation of 27.98 dB; where this cancellation was approximately uniform over the entire 80-MHz bandwidth of the AWGN signal. Following this demonstration at 2.48 GHz, the center frequency of signal A was varied in discrete steps from 1 GHz to 20 GHz. The optical attenuation and optical delay were not changed—they were previously adjusted to obtain cancellation at 2.48 GHz (yielding the result shown in FIG. 5)—and were not touched again for the duration of the experiment. The center frequency of signal A was adjusted to the values 1 GHz, 2 GHz, 3 GHz, 5 GHz, 10 GHz, 15 GHz, and 20 GHz. The cancellation values, as calculated according to Equation 1, were 31.41 dB, 30.7 dB, 30.27 dB, 29.45 dB, 17.57 dB, 27.88 dB, and 16.7 dB, respectively. For the frequencies above 5 GHz, the power of signal generator 810 was increased to 23 dBm to overcome frequency-dependent losses external to the optical cancellation system (such as those due to the antennas). The cancellation as displayed on the HP spectrum analyzer at center frequencies of 5, 10, and 20 GHz were notably less than the 82.53 dB result.

In addition to providing deep cancellation levels, it is also desirable for the counter-phase optical cancellation system to recover a weakly received signal of interest. This weak signal must be recovered with a minimum of nonlinear distortion; and with a signal-to-noise ratio that is as high as possible.

The counter-phase optical-modulation technique requires optical fine-tuning; that is, the optical attenuation and optical delay must be precisely adjusted in order to achieve optimal cancellation. In the examples described above, these parameters were adjusted manually; using a trial-and-error approach. "Trial-and-error" refers to a method in which the radio-frequency output of the system was viewed on a spectrum analyzer, and the optical attenuation and optical delay were adjusted until the radio-frequency output was reduced to the noise floor.

A variety of systems and methods for automatically controlling that fine-tuning may be used in the present invention. Two exemplary embodiments incorporating systems and methods for automatic feedback control, both of which completely obviate the need for manual tuning of the optical attenuation and optical delay, are presented here. The first embodiment, which can be likened to a household climate-control-system controller, monitors the output radiofrequency signal power and adjusts the optical attenuation and delay until a minimum of radio-frequency signal power is obtained at the output. This method is referred to herein as the "dither" method. The second embodiment incorporating automatic control is referred herein as the "parameter offset" method. For a given optical attenuation setting and optical delay setting, this method immediately tells the user or system whether more or less optical attenuation and delay are required, so that a minimum of radio-frequency power is always obtained. Before discussing these two embodiments, a way of optimizing both control methods by "jumping" to near-optimal values of optical attenuation and delay is discussed.

Open-Loop Control for Expedited Cancellation

The optical cancellation system and method of the present invention was described above in the context of solving a basic, hypothetical problem of co-site interference mitigation, in which a weak radio-frequency (RF) signal, denoted B, must be received while a second stronger signal, denoted A, is being transmitted in close proximity. It was assumed that the power of the signal A was far greater (perhaps at least 10,000 times greater) than that of signal B. It was further assumed that the signal B may occupy the same band of frequencies as the signal A. Because the signal A is known, the rationale here is to split the strong signal A into two sub-signals, and feed one of these sub-signals into the optical cancellation system; the other sub-signal is provided as input to a transmitting antenna. The opt-cancellation system then inverts and subtracts the sub-signal (A) provided to it from the net received signal (A+B). As its name implies, the system performs this subtraction. The novelty of the counter-phase optical cancellation technique is that it immediately inverts one of the signals "upon entry" into the system. This inversion is realized by the negative-modulation bias on the bottom Mach-Zehnder electro-optic modulator, as discussed above. Once this inversion is performed, the variable optical attenuator and variable optical delay line serve to eliminate any remaining fluctuations or mismatches that would otherwise corrupt the subtraction/cancellation effect.

Figure 9:
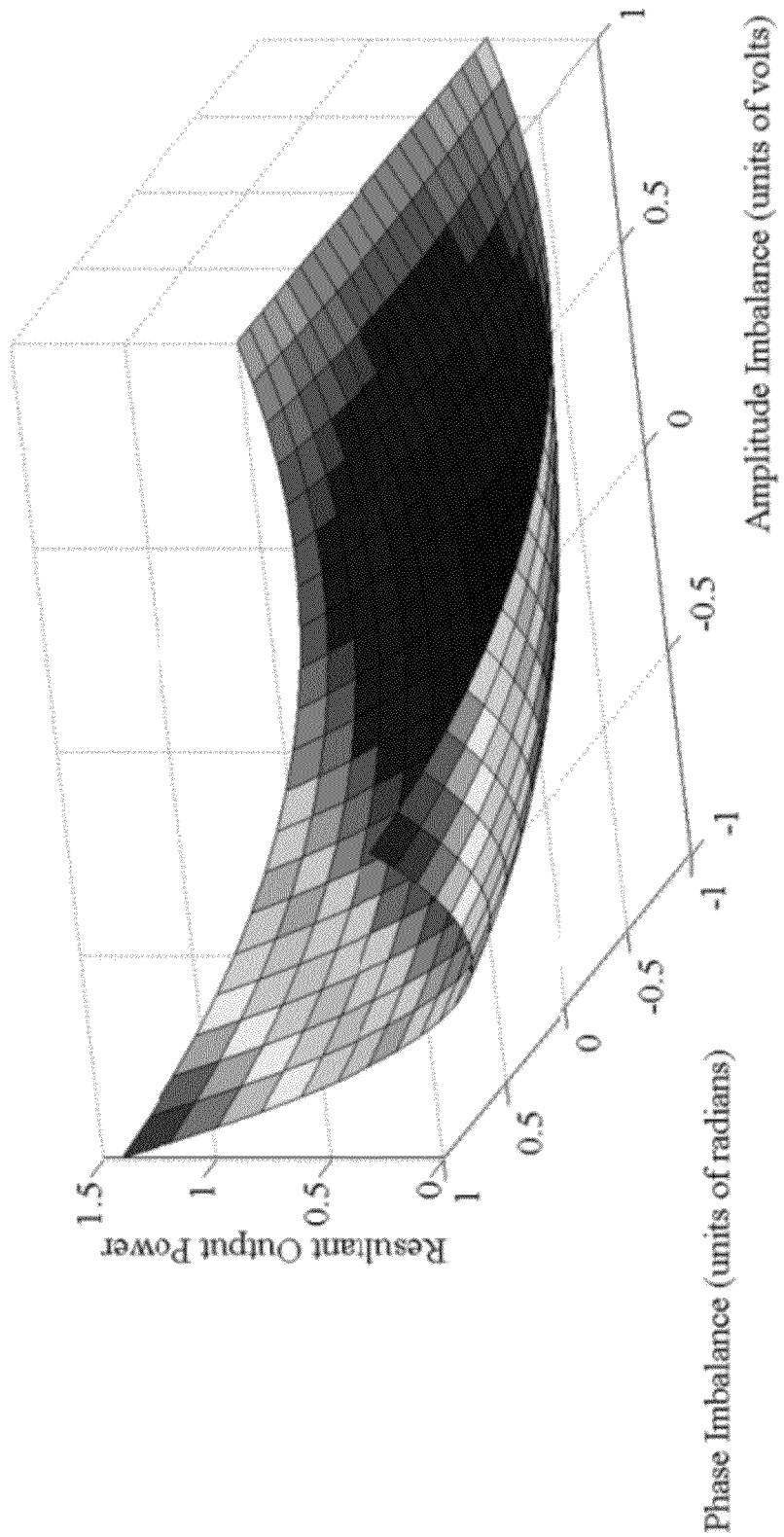
FIG. 9 is a graph of the average power $S1(t)$-$S2(t)$, a surface in the space of power versus amplitude imbalance and phase imbalance.

The variable optical attenuator and variable optical delay line may be manually adjusted; but it is beneficial to have automatic adjustment of these instruments. The optical cancellation system and method of the present invention has the ability to recover a weak radio-frequency signal in the presence of a more powerful, locally-generated interfering signal. This capability ranges over a wide frequency bandwidth. The cancellation operation can be generalized as a type of wideband analog subtraction. The radio-frequency signal denoted A may be expressed as two sub-signals $S1(t)$ and $S2(t)$. This is because signal A is split into two (ideally) identical signals before being sent as input into each of the Mach-Zehnder electro-optic modulators. As an example, suppose the signals are expressed as $S1(t)=(1-\alpha)\cos(2\pi ft+\phi)$ and $S2(t)=\cos(2\pi ft)$, where $\alpha$ represents an amplitude mismatch between the signals, and $\phi$ represents a phase difference or, equivalently, a time-delay mismatch between the signals. The goal is to subtract these two signals, yielding the difference $S1(t)-S2(t)=(1-\alpha)\cos(2\pi ft+\phi)-(\cos(2\pi ft))$ and to minimize this difference. Ideally, the difference would be zero. In general, the difference $S1(t)-S2(t)$ is a function of the attenuation and delay between $S1(t)$ and $S2(t)$. It is a frequency-dependent function as well, but for purposes of simplicity, that dependence is not discussed here. FIG. 9 shows a plot of the average power corresponding to the difference $S1(t)-S2(t)$, given by $$\frac{1}{T}\int_0^T [S_1(t)-S_2(t)]^2 dt = \tag{2}$$

$$\frac{1}{T}\int_0^T [[(1-\alpha)\cos\phi - 1]\cos(2\pi ft) - (1-\alpha)\sin\phi\sin(2\pi ft)]^2 dt =$$

$$\frac{\alpha^2}{2} + (1-\cos\phi)(1-\alpha)$$

The graph shows a surface in the space of power versus attenuation and delay. The automatic control attempts to apply the optical cancellation system so that the global minimum in FIG. 9 may be reached, or approached as closely as possible. The cancellation of signal A will be facilitated if one can ensure S1=S2=signal A; but this will not always be possible in practice. When signal A is split into two sub-signals S1 and S2, these two signals may traverse different paths before they enter the optical cancellation system. "Different paths," as used herein means propagation channels which present unequal amounts of attenuation and/or delay to each signal. If this is the case, then simple inversion will not be sufficient to guarantee optimal subtraction—some type of correction will also be required. This is the purpose of the variable optical attenuator and variable optical delay line, which are to be controlled automatically. A first step of an automatic control method is to estimate the error or, in this case, the initial amounts of mismatch in attenuation and delay between signals S1 and S2, and correct for these mismatches. These corrections were implemented by system 1000 shown in FIG. 10.

Figure 10:
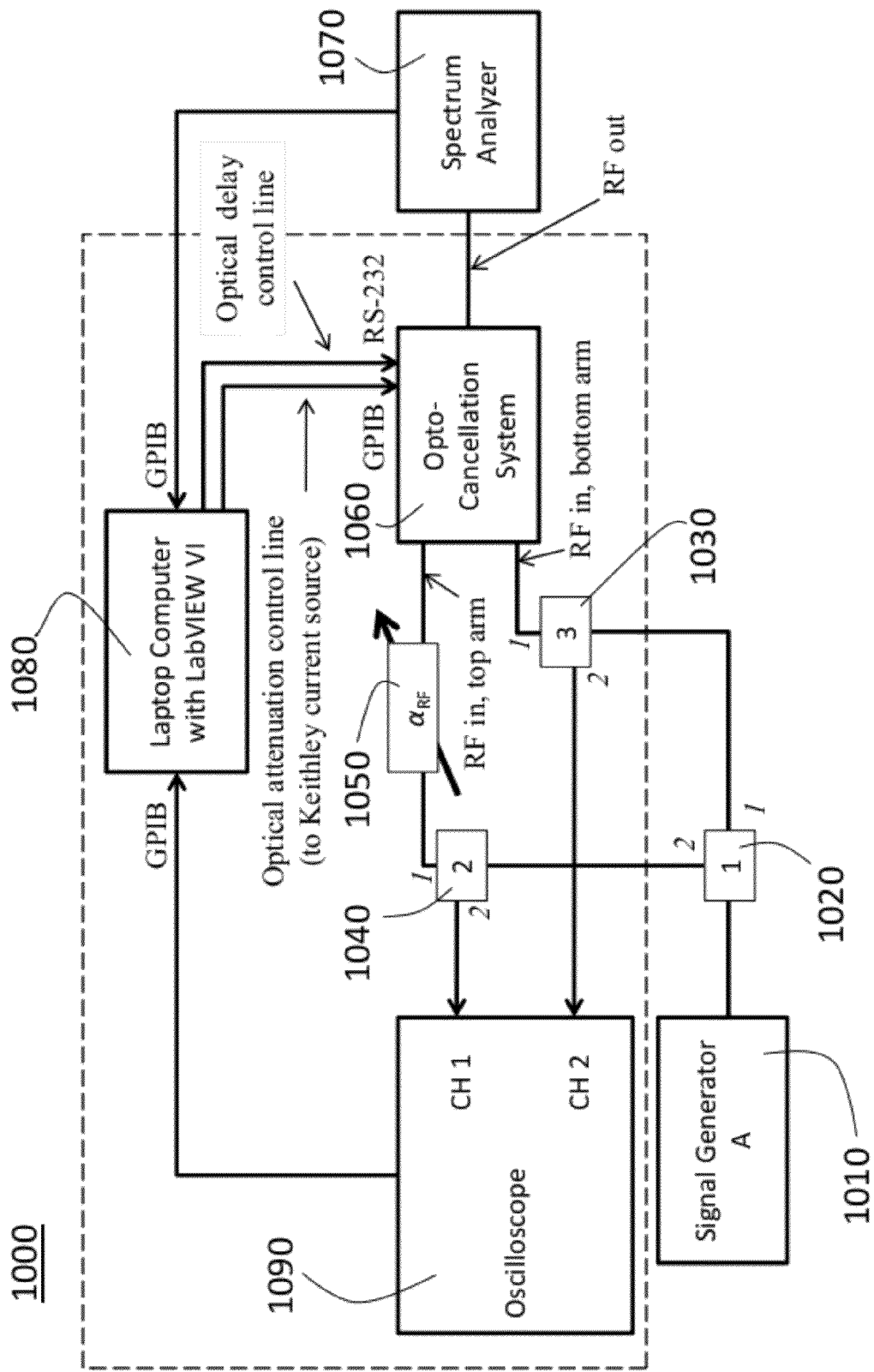
FIG. 10 is a block diagram illustrating open loop control in a preferred embodiment of the present invention.

The system 1000 included several instruments external to the optical cancellation system 1060: a Tektronix TDS 3054B oscilloscope 1090, a laptop computer equipped with Lab-VIEW VI (a National Instruments software package specially designed for instrumentation) 1080, and a Keithley 2400 SourceMeter for controlling the optical cancellation system's variable optical attenuator. Internal to the optical cancellation system, and relevant to the open-loop control implementation, were the FDK YS-5010-155 current-controlled optical attenuator and the Newport F-MDL programmable motorized optical delay line. The oscilloscope 1090, laptop computer 1080, and SourceMeter were all connected on a general-purpose interface bus (GPIB) so that information could be exchanged among the various instruments via LabVIEW. The delay line was indirectly connected to the GPIB via an RS-232 interface. As shown in FIG. 10, the purpose of the oscilloscope 1090 was to first detect the amount of attenuation or delay imbalance between the two RF signals prior to their entry into the optical cancellation system. This imbalance was then "read" by a custom-programmed LabVIEW program (referred to as a virtual instrument, or VI). The LabVIEW VI then calculated values of electrical current (for the optical attenuator) and optical delay which were sent, via the GPIB bus and serial interface, to the Keithley SourceMeter and Newport optical delay line, respectively. The method by which the LabVIEW VI calculated the necessary electrical current for the optical attenuator will be described below.

The optical attenuator used in this embodiment of the optical cancellation system is a current controlled attenuator. For a precision application such as analog subtraction, it is helpful to know the exact amount of current that corresponds to a desired amount of attenuation. Similar comments apply to the optical delay line and required phase adjustments. For example, suppose the oscilloscope 1090 in FIG. 10 detects an amplitude imbalance of 0.75 dB between the two RF propagation paths. It is assumed that excess power is present in the bottom path of the optical cancellation (or "opto-cancellation") system 1060, since the generator 1010 providing signal A is directly connected to this bottom path.

Since 1 dB of attenuation in the RF domain corresponds to 2 dB of attenuation in the optical domain, it is evident that 2.75 dB of optical attenuation must be applied in order to correct for the 1.2 dB of amplitude imbalance measured at the input. It follows that the Keithley SourceMeter must provide the proper amount of current to the optical attenuator, so that it will provide the necessary 2.75 dB of attenuation. Because attenuation vs. current information was not available for this particular optical attenuator, a characterization of the attenuator was performed. To that end, 9.43 dBm of optical power was provided as direct input to the optical attenuator using a CW laser source, and the output was connected to an optical power meter. Using the Keithley SourceMeter, the current through the attenuator was adjusted to various values, and a table of current vs. attenuation was produced. However, it was recognized that this table provided a listing of the amount of attenuation provided for a given value of current. For automatic adjustment of the optical attenuation, it was understood that the necessary information was a tabulation—or formula—providing the required amount of current for a given attenuation value. This is because of the need to first detect the amount of amplitude imbalance, and then provide the necessary current to the optical attenuator which will correct that imbalance. To that end, a regression analysis was performed using a LabVIEW virtual instrument. As a result of this regression analysis, an eighth order polynomial was produced, which exhibited the best fit to the current vs. attenuation data. This polynomial was programmed into a separate LabVIEW virtual instrument, and was used to implement the automatic attenuation adjustment described here. A similar regression analysis was not needed for controlling the optical delay line, because the required delay value was directly sent to the delay line—no value of current was needed.

Note that the purpose of the open-loop control is to first identify the amount of attenuation/delay imbalance that exists external to the optical cancellation system, and correct for it. This correction sought to make the difference S1–S2 as small as possible initially. Graphically, this corresponds to operation of the optical cancellation system at a point close to the global minimum on the surface shown in FIG. 9. Ideally, it is quite possible that the initial correction may permit the global minimum to be reached precisely. But, recall that system operation at the global minimum is the result of perfect correction for the imbalances which exist between the two RF propagation paths. Any condition which disrupts the state of the RF propagation paths after this correction has been made will void the benefits of that correction. Therefore, closed loop control will continually ensure that the cancellation remains optimized, even if the RF propagation paths change dynamically.

Dither Method of Closed-Loop Control

Figure 11:
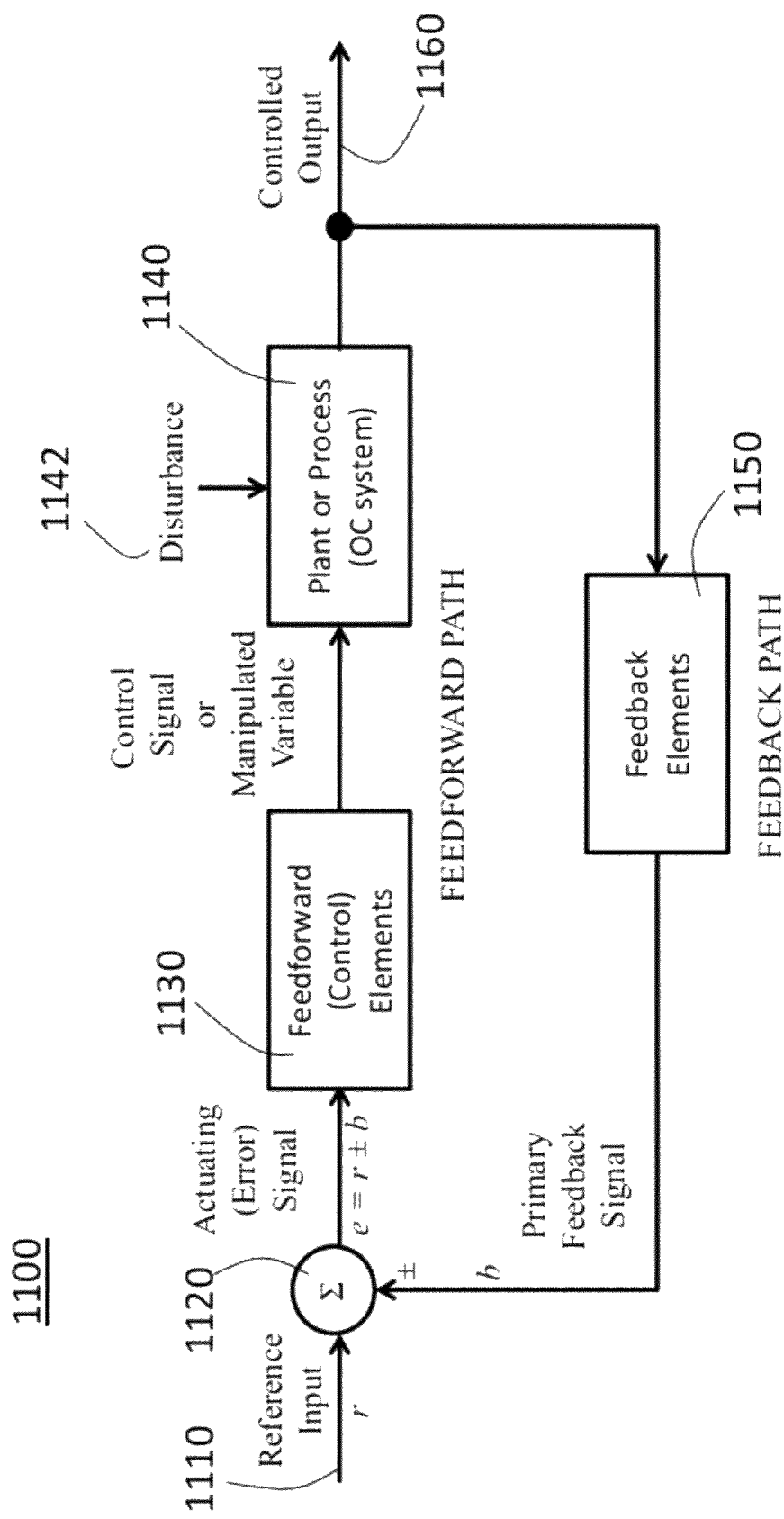
FIG. 11 is a block diagram of a feedback amplifier that may be used in a preferred embodiment of the present invention.

FIG. 11 shows a general feedback amplifier configuration 1100. A reference input 1110 is inputted into a summer 1120 where it is summed with a primary feedback signal. An actuating error signal output from the summer 1120 is input into feedforward control elements 1130 which output a control signal or manipulated variable to the plant or process (optical cancellation) system 1140, where a disturbance 1142 is introduced. The controlled output 1160 from the optical cancellation system is output but also is fed back to feedback elements 1150. In the previous section, the feed-forward path 1130 of this general feedback amplifier 1100 was addressed, involving initial correction for the error signal denoted e(t). The feedback path 1150 and how the error signal may be dynamically corrected is now addressed. One way of doing this involves simply monitoring the cancellation of signal A, by measuring the power of signal A at the output of the optical cancellation system. If this power exceeds a certain user-defined threshold, the optical attenuation and optical delay are then readjusted until the power of signal A (at the output of the optical cancellation system) is reduced below that threshold. This method is appropriately called dithering because of the back-and-forth searching action by which the optical attenuation and delay are adjusted. These adjustments are continued until the power of signal A is reduced below the aforementioned threshold.

The setup of an example for realizing this method of control is illustrated in FIG. 10. Notice that the only addition to the open-loop control system is the spectrum analyzer 1070. A description of the role of each instrument in this open-loop control system will now be presented.

Signal Generator A.

The signal generator 1010 provided signal A to the optical cancellation system 1060. Signal A was split into two sub-signals using a resistive RF power splitter 1020 (splitter 1), and both of these sub-signals were presented as inputs to the optical cancellation system. However, prior to their entry into the optical cancellation system, each of these sub-signals was split once again using another resistive splitter 1040, 1030 (splitters 2 and 3). This enabled each subsignal to be sent not only to the optical cancellation system, but to the oscilloscope 1090 as well. Strictly speaking, signal generator A 1010 is not a part of the control loop. The two signals emerging from splitter 1 will be referred to as A-signals.

Oscilloscope.

This permitted acquisition of the amplitude and phase imbalance between the two A-signals which entered the optical cancellation system. Referring to FIG. 10, note that one of the outputs of resistive splitter 1040 was connected to channel 1 of the oscilloscope 1090; while one of the outputs of resistive splitter 1030 was connected to channel 2 of the oscilloscope 1090. The Tektronix oscilloscope 1090 used in this particular setup had an option which allowed the phase and amplitude parameters to be measured internally, and passed along the GPIB.

Current Source.

The purpose of the current source 1050 was to provide electrical current in precise amounts, for operating the optical attenuator inside the optical cancellation system. The Keithley SourceMeter used in this setup received electrical current settings, typically in milliamperes, via the GPIB.

Programmable, Motorized Optical Delay Line.

Similar to the current source, the programmable optical delay line received commands, via the RS-232 interface, in the form of time-delay increments. These increments were typically in the picosecond range.

Spectrum Analyzer.

The purpose of the spectrum analyzer 1070 was to monitor the output power of the cancelled signal A at the output of the OC system. This power level was then sent, also via the GPIB, to the laptop computer. It can be seen that this instrument physically "closes the loop" in the feedback path.

Laptop Computer with LabVIEW Instrumentation Software.

Serving as the "brain" of the system, a LabVIEW VI was programmed and saved into a laptop computer 1080, and was running for the duration of all experiments performed in this section. The LabVIEW VI received data from the oscilloscope 1090, regarding the initial amplitude and phase mismatches, between the incoming A-signals. The LabVIEW VI also received data from the spectrum analyzer 1070, regarding the power level of the cancelled signal A at the output. According to these received data values, the LabVIEW VI calculated the necessary amount of electrical current and optical time-delay, in order to optimize the cancellation at the optical cancellation system's output. These calculated values were sent, via the GPIB and RS-232 interface, to the current source and optical delay line; respectively.

The method and computational details of the LabVIEW VI are now described in a step-by-step fashion:

1. User Inputs an Output-Power Threshold for the Anticipated Cancellation of Signal A.

This threshold, of course, will depend on the depth of cancellation that the optical cancellation system can provide. It will also depend on the noise floor of the spectrum analyzer. In order to minimize this noise floor, the spectrum analyzer was set to a span of 100 kHz and a resolution bandwidth of 51.1 Hz. These settings were feasible because only a narrow-band signal was employed as signal A in these experiments. The reference level was set to −35 dBm.

2. Upon Running the VI, the Oscilloscope Measures the Amplitude and Phase Mismatches Between the A-Signals Upon their Entry into the Optical Cancellation System.

3. Correction for the Measured RF Amplitude and Delay Imbalances is then Applied by the Optical Attenuator and Delay Line.

For this step the attenuation-versus-current regression polynomial discussed above was utilized to ensure that the correct relationship between RF and optical attenuation was understood.

4. The Power of the Cancelled Signal A, at the Output of the Optical Cancellation System, is Displayed on the Spectrum Analyzer and Fed Back to the VI.

Ideally, this power level would be small because of successful cancellation by the optical cancellation system, but this was not always the case. Slight fluctuations disrupted the cancellation of signal A—this was made apparent by a rise in the power of signal A at the output.

5. Using the Output-Power Reading of Signal A, the VI Will then Readjust the Optical Attenuation and Delay in Small Increments, by Sending Parameter Values to the Appropriate Instruments.

This readjustment was performed continuously, similar to the manual dithering adjustment described above. This process continued until signal A was cancelled below the user-defined threshold, as measured on the spectrum analyzer. It is apparent that the initial error correction, described above, was particularly valuable here. The closer the initial error correction brought the output power to the global minimum, the less dithering was required.

In the event that the power of signal A increased above the user-defined threshold, the process would resume, beginning with step 3. Although this method is interesting (and reassuring) because it shows that a relatively straightforward instrumentation system can provide reliable and repeatable cancellation. The aforementioned LabVIEW VI was used to control the optical cancellation system with an input signal A of 5 dBm power and a frequency which ranged from 200 MHz to 1 GHz in 10-MHz increments. In each trial, signal A was cancelled down to the spectrum analyzer's noise floor of approximately −110 dBm, without the need for manual adjustment. The maximum value of signal A, measured at the output of the OC system on the spectrum analyzer prior to cancellation, was no higher than −38 dBm. After cancellation had been achieved, a variable RF attenuator—placed in the top RF input path—was manually adjusted in order to change the amplitude imbalance between the input A signals. The optical cancellation system automatically readjusted the optical attenuation and delay settings to obtain cancellation. It is evident that the simplicity of the optical cancellation system—specifically, its dependence on only two variables: optical attenuation and delay—lends itself to a conceptually simple method of automatic control.

Parameter-Offset Method of Closed-Loop Control

Figure 12:
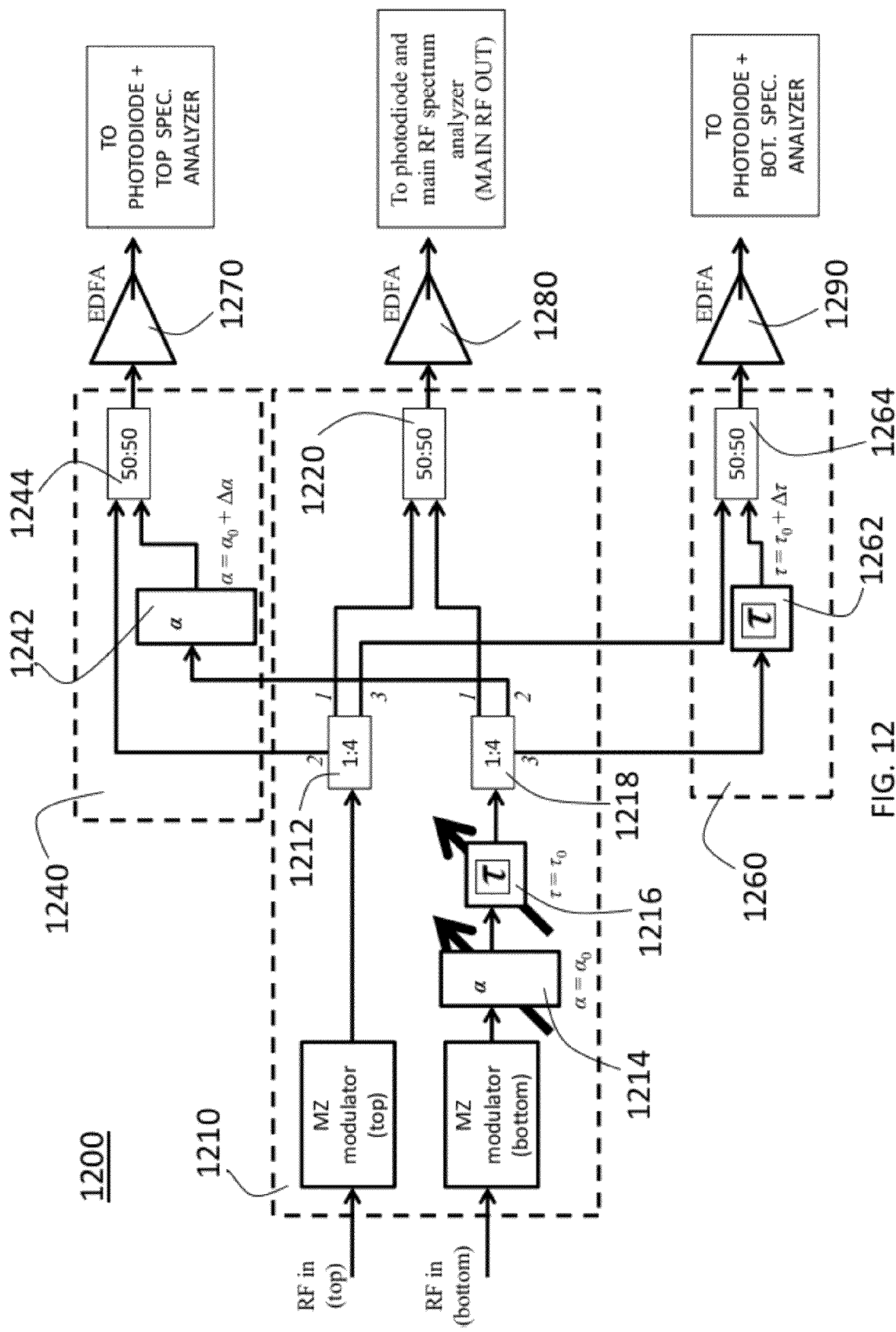
FIG. 12 is a block diagram illustrating a parameter-offset method of closed-loop control in a preferred embodiment of the present invention.

The parameter-offset method may be best described by an example, and by referring to the graphical description shown in FIG. 12. The figure illustrates the hardware modifications required in order to implement the parameter-offset method. The reason for the name "parameter offset" will become clear shortly. Suppose again that signal A is a sinusoidal signal to be cancelled. Upon splitting this signal into the two A-signals (as described previously), one may anticipate there will be amplitude and delay mismatches requiring correction. This will be made apparent by the power level of signal A shown on the output of the spectrum analyzer—we expect it to not be cancelled; presumably at a maximum. Of course, the mismatches may be corrected by the initial error correction method described previously, but this may still be insufficient for optimal cancellation of signal A. In other words, the initial error correction has brought the output power of signal A close to the global minimum of the surface shown in FIG. 9—but not precisely at that point. Now, note that the ability to reach this global minimum entails application of the correct amount of optical attenuation and delay. If signal A's output power is not at this global minimum point, one may interpret the situation as the application of incorrect values of optical attenuation and delay. Consequently, a greater or lesser amount of optical attenuation will be required of the optical cancellation system; a similar statement applies for the optical delay. It would be beneficial to know if—for a given attenuation setting—more or less attenuation is required (and similarly for the delay). The parameter-offset method provides this information immediately.

Referring to FIG. 12, there is a main pair 1210 and two secondary pairs 1240, 1260, referred to as the top secondary pair 1240 and bottom secondary pair 1260. The word "pair" is used because, in the original optical cancellation system, two RF photonic links are effectively connected in parallel; the two links constitute a pair. Each optical path, or link, is referred to as an arm. Recall that the original, unmodified optical cancellation system comprised an optical attenuator and optical delay line in its bottom arm. It can be seen that this original architecture is present in the main pair 1210 of the new architecture shown in FIG. 12. This will become apparent by following two paths in the figure: (1) Starting with the words "RF in, top", through the top arm of the main pair 1210, into the top 1:4 optical splitter 1212, out of the splitter through the path labeled "1", and toward the 50:50 combiner 1220. The output of the combiner 1120 goes through EDFA 1280 to a photodiode and the main RF spectrum analyzer. (2) Starting with the words "RF in, bottom", through the bottom arm of the main pair 1210, through the optical attenuator 1214 and delay line 1216, into the bottom 1:4 optical splitter 1218, out of the splitter through the path labeled "1", and toward the 50:50 combiner 1220. The words "MAIN RF OUT", enclosed by the solid box, designate the RF output of interest. As before, this is the RF output that would be passed to a radio receiver front-end in a practical system implementation. Returning to the cancellation scenario at the start of this section, suppose the optical attenuator 1214 in the main pair 1210 is currently providing $\alpha 0=1$ dB of optical attenuation; and the optical delay line 1216 in the main pair 1210 is providing $\tau 0=100$ ps of optical delay. These settings represent a first attempt to correct for RF amplitude and delay imbalances. Also suppose that the global minimum for the subtraction of the A-signals lies at the point Pmin(attenuation, delay) =(2 dB, 300 ps); but this is not known. Then, it can be stated that 1 dB more attenuation is required, and 200 ps more delay is required. The parameter offset method provides this information in the manner now described.

First, the output power corresponding to P1(attenuation, delay)=(1 dB, 100 ps) will appear on the main spectrum analyzer shown. Recall that this output corresponds to the RF output of interest. The output power corresponding to (1 dB, 100 ps) is considerably lower than the value obtained prior to the application of the optical attenuation and delay, but is still not minimal. Now, focus on the bottom arm of the bottom secondary pair 1260. For a given amount of delay provided by the delay line in the bottom arm of the main pair 1210, the delay line 1262 in the bottom arm of the bottom secondary pair 1260 will provide slightly more delay than that provided by the delay line in the main pair 1210. The output from the delay 1262 goes to the 50:50 combiner 1264 along with one of the outputs from splitter 1212. This can be seen in FIG. 12 by starting with the delay line 1216 in the main pair 1210, symbolized by $\tau=\tau 0$ (where $\tau 0=100$ ps in this example); and following the path denoted "3" through the bottom 1:4 optical power splitter 1218, down to the bottom arm of the bottom secondary pair 1260. Continuing along this path, notice that a variable optical delay line 1262 denoted $\tau=\tau 0+\Delta\tau$ is encountered. This notation indicates that this delay line provides slightly more delay than that of the main pair 1210. In our laboratory setup, this optical delay line was a General Photonics VDL-001-35-60 variable optical delay line, manually adjusted to provide $\Delta\tau=100$ ps. The output of the combiner 1264 goes through EDFA 1290 to a photodiode and the bottom spectrum analyzer.

Therefore, the bottom spectrum analyzer will show an RF output power of signal A corresponding to (attenuation, delay)=(1 dBm, 100 ps+100 ps)=(1 dB, 200 ps). This power level will be referred to as Pbottom. Now, focusing attention on the bottom arm of the top secondary pair 1240, it can be seen that the top spectrum analyzer will display an output power corresponding to (attenuation, delay)=($\alpha 0+\Delta\alpha$, $\tau 0$). In our laboratory setup, the variable optical attenuator 1242, labeled $\alpha 0+\Delta\alpha$, was set to provide $\Delta\alpha=1$ dB attenuation. The signal from the optical attenuator 1242 goes to the 50:50 combiner 1244 where it is combined with one of the signals from splitter 1212. It then is output from the combiner 1244 through EDFA 1270 to a photodiode and top spectrum analyzer. Therefore, the power level shown on the top spectrum analyzer will correspond to the point (attenuation, delay)=(2 dBm, 100 ps). This power level will be referred to as Ptop.

Recall that the global minimum of output power for signal A lies at the point Pmin(2 dB, 300 ps), but we are not aware of this. Because the top and bottom secondary pairs both provided values of attenuation and delay, respectively, which are closer to Pmin than the original P1(1 dB, 100 ps) provided by the main pair 1210, the power values Ptop and Pbottom will be somewhat lower than P1. This is an indication that 1 dB more attenuation and 100 ps more delay are desirable—and therefore these amounts should be added to the attenuation and delay provided by the main pair. At this point, the reason for the name parameter offset should be apparent: the secondary pairs provide "foresight" into the cancellation that would be obtained if the attenuation and delay parameters are slightly offset from the values applied by the main pair. The advantage of this approach is that it provides immediate information as to whether more or less attenuation and more or less delay are required. Continuing with the example, it can be seen that repeated iterations will eventually allow the main pair to provide the values of attenuation and delay required for the global minimum of output power.

Comparisons Between the Methods

It can be seen that the parameter-offset method can rapidly yield the appropriate direction in which to travel, on the power-attenuation-delay surface, in order to reach the global minimum of power. Combined with an effective initial error correction routine, the parameter-offset method can be coupled with a suitable algorithm to adaptively and automatically yield optimal cancellation without the "randomness" of the dithering method. The initial error correction plays an important role in the ability of either technique to facilitate optimum cancellation. Such initial correction alleviates the burden to be solved by the closed-loop method that is ultimately used. It should be observed that the rapidity with which the parameter-offset method can obtain optimal cancellation does not come without cost. Note that three spectrum analyzers were required for the laboratory setup.

As also shown in FIG. 12, the bottom arm of the main pair must be duplicated to provide additional optical attenuation and delay—therefore requiring the top and bottom secondary pairs, respectively. In contrast, the experimental setup for the dithering method required only a single spectrum analyzer for feeding back the data. The trade-offs here are the simplicity of dithering vs. the complexity and cost of parameter offset on the one hand; but the efficiency and speed of parameter offset versus the latency of dithering.

Practical Considerations for Implementation

As described above, the notation $\alpha 0+\Delta\alpha$ is used in FIG. 9 to indicate that the bottom arm of the top secondary pair provides slightly more optical attenuation than the main pair. Likewise, the notation $\tau 0+\Delta\tau$ is used for similar reasons pertaining to the optical delay. To prevent overshooting or undershooting the global minimum, it is essential for $\Delta\alpha$ and $\Delta\tau$ to be sufficiently small. This can be understood by a counterexample: Suppose $\Delta\alpha$ and $\Delta\tau$ are large—5 dB and 500 ps, respectively, for example. For the case in which the global minimum lies only 0.5 dB and 120 ps away from the current attenuation and delay settings, the global minimum would be missed entirely. Therefore, smaller increments will provide a greater resolution in the search for the global minimum. Of course, a smaller step size may certainly increase the number of steps which need to be taken. It is therefore preferred that the response times of the optical attenuator and delay line are taken into consideration as well, in order to facilitate rapid convergence to the minimum. The exemplary setup shown in FIG. 12 used $\Delta\alpha=1$ dB and $\Delta\tau=100$ ps. These values were decided upon because of practical limitations such as the lengths of optical fibers that were available, and the amounts of additional attenuation imposed by the 1:4 optical power splitters, for example. These would not be issues of concern if the system was implemented in integrated form, since a precise value of $\Delta\tau$ could be fabricated into the substrate; and arbitrary-length waveguides could be fabricated and matched to close tolerances. Some additional, general comments are in order regarding practical implementation of the optical cancellation system. The programmable, motorized optical delay line in an implementation of the optical cancellation system can provide a maximum delay of 600 ps. This number is a practical limitation on the amount of optical correction that can be applied. Effectively, this means if more than 600 ps of time delay exists between the two A-signals upon their entry into the optical cancellation system, then the optical cancellation system (in its current form) will not be able to provide optimal cancellation. In summary, then, the cancellation level is a function of the optical attenuation and delay resolution, as well as the optical delay range. The exact nature of this function will depend on the mathematical expression(s) defining the signal to be cancelled. Strictly speaking, the cancellation level is also a function of the optical attenuation range as well, but this detail need not be considered. This is because sufficient RF attenuation must be affixed to the optical cancellation system inputs to ensure that excess power is not presented to the system. Although imbalances will persist, modern optical attenuators—such as the one used in the current optical cancellation system implementation—will provide sufficient attenuation range to compensate for them. Regarding optical delay range and resolution, the fact remains that these will impose a limit on the amount of cancellation that can be achieved. However, integrated-optic technology allows for the fabrication of integrated delays that are as small as photolithography techniques will allow. The range of such integrated delay lines, and the number of delays which can be incorporated on a given substrate, will be limited by size and cost constraints.

Until this point, we have assumed that the mismatches in the A-signals which reach the optical cancellation system are direct outputs of a resistive RF power splitter or divider. Of course, this is a somewhat idealized situation, leading to minimal imbalances at the optical cancellation system inputs. These imbalances may be due to slightly mismatched frequency responses in the coaxial cables feeding the optical cancellation system, slightly mismatched lengths in those cables, or mismatches in the electro-optic modulators' electrodes, for example. It is also possible there may be some error in the imbalance measurements provided by the oscilloscope. In any event, again, those imbalances will be minimal. While adaptive compensation of such "idealized" mismatches is adequate for proof-of-principle results in a laboratory setting, it is equally important to anticipate the kinds of mismatches which may occur in practice—and discuss how they might be compensated—as an impetus for future investigation. One cause of imbalances between the A signals is relative motion between the transmitting and receiving antennas. It is reasonable to assume that such movements will occur on the order of milliseconds. Therefore, the control loops described herein will need to operate on the order of milliseconds; ideally faster. The speed of adjustment preferably is faster than the speed of the anticipated fluctuations. As a consequence, the motorized optical delay line currently used in the system would not be suitable in a more practical scenario, unless relative motion between the antennas could be minimized. In this case, the use of integrated optical delays would be more appropriate. Another cause of imbalances between the A-signals is multipath propagation effects.

C. Stability

For the present problem of interference cancellation by analog subtraction, stability is defined as convergence to a minimum value of power. The undesirable oscillatory response corresponds to fluctuation in the optical cancellation system's A signal output power between two points, on the power-versus-$(\alpha, \tau)$ surface, which differ from the global minimum on that surface. The undesirable response of unbounded increase corresponds to complete offshoot from the global minimum on that surface. The unbounded-increase response may be avoided by the use of initial error correction. Avoidance of the oscillatory response requires the use of small steps in optical attenuation and delay. This may be stated more precisely by revisiting Equation (2) above, and expanding it into its Taylor series about the point of perfect cancellation $(\alpha=\phi=0)$:

$$\frac{\alpha^2}{2} + (1 - \cos\phi)(1 - \alpha) \approx \frac{1}{2}[\alpha^2 + \phi^2 - \alpha\phi^2 + O(\alpha^2\phi^2)]$$

This last equation shows that, in the vicinity of the global minimum of power, the power-versus-$(\alpha, \phi)$ surface behaves as an elliptic paraboloid. In the case of the parameter-offset method, one is then guaranteed to have a stable operating point at that minimum, provided $\Delta\alpha$ and $\Delta\tau$ are small. Similar reasoning applies to the dithering method as well. The requirement of small $\alpha$ and small $\tau$ was met in the implementation of the dithering method by provisioning for small increments of current and delay in the LabVIEW VI.

These increments were automatically varied by the VI: at any given time, the present increment was varied according to the previous change in attenuation or delay (dependent on whether that change was an increase or decrease in the signal-output power).

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. An interference cancellation system comprising:
    a first electro-optic modulator for receiving a first signal;
    a second electro-optical modulator for receiving a second signal together with said first signal, said first and second electro-optical modulators being biased for parallel counter-phase modulation;
    an optical attenuator connected to said second electro-optical modulator;
    an optical coupler connected to said first and second electro-optical modulators, said second electro-optic modulator being connected to said optical coupler through said optical attenuator and said optical delay.

2. An interference cancellation system according to claim 1, further comprising a control subsystem for automatically controlling said optical attenuator and/or said optical delay.

3. An interference cancellation system according to claim 2, wherein said control subsystem comprises an open loop control subsystem.

4. An interference cancellation system according to claim 2, wherein said control subsystem comprises a closed loop control subsystem.

5. An interference cancellation system according to claim 4, wherein said closed loop control subsystem employs a dither method of feedback control.

6. An interference cancellation system according to claim 4, wherein said closed loop control subsystem employs a parameter offset method of feedback control.

7. An interference cancellation system according to claim 1, wherein said optical delay is connected to said second electro-optical modulator through said optical attenuator.

8. An interference cancellation system according to claim 1, further comprising:
    an optical attenuator connected to said first electro-optic modulator; and
    an optical delay connected to said first electro-optic modulator.

9. An interference cancellation system according to claim 1, wherein said electro-optic modulator comprises an interferometric optical modulator.

10. An interference cancellation system according to claim 9, where said interferometric modulator comprises a Mach-Zehnder optical modulator.

11. An interference cancellation system according to claim 9, wherein said control subsystem comprises an open loop control subsystem.

12. An interference cancellation system according to claim 1, further comprising:
    a first laser serving as an input to said first electro-optic modulator; and a second laser serving as an input to said second electro-optic modulator.

13. An interference cancellation system according to claim 1, wherein said first laser operates at a different wavelength than said second laser.

14. An interference mitigation system for recovering a weak signal at a location in close proximity to a transmitter that is transmitting a strong signal, the system comprising:
a splitter having an output connected to an optical cancellation system for providing said strong signal to said optical cancellation system;
a receiver for receiving said weak signal, said receiver having an output connected to said optical cancellation system;
said optical cancellation system comprising:
a first electro-optic modulator for modulating said strong signal received from said splitter;
a combiner for combining said strong signal received from said splitter and said weak signal received from said receiver into a combined signal;
a second electro-optic modulator for modulating said combined signal, said first and second electro-optic modulators being biased for parallel counter-phase modulation;
an optical attenuator connected to said second electro-optic modulator;
an optical delay connected to said second electro-optic modulator; and
an optical coupler connected to said first and second electro-optic modulators, said second electro-optic modulator being connected to said optical coupler through said optical attenuator and said optical delay.

15. An interference cancellation system according to claim 14, further comprising a control subsystem for automatically controlling said optical attenuator and/or said optical delay.

16. An interference cancellation system according to claim 14, wherein said control subsystem comprises a closed loop control subsystem.

17. An interference cancellation system according to claim 16, wherein said closed loop control subsystem employs a dither method of feedback control.

18. An interference cancellation system according to claim 16, wherein said closed loop control subsystem employs a parameter offset method of feedback control.

19. An interference cancellation system comprising:
a first electro-optic modulator for receiving a first electrical signal;
a second electro-optical modulator for receiving a second electrical signal together with said first electrical signal, said first and second electro-optical modulators being biased for parallel counter-phase modulation;
an optical attenuator connected to said second electro-optical modulator;
an optical delay connected to said second electro-optical modulator; and
an optical coupler connected to said first and second electro-optical modulators, said second electro-optical modulator being connected to said optical coupler through said optical attenuator and said optical delay.

20. An interference cancellation system according to claim 19, further comprising a control subsystem for automatically controlling said optical attenuator and/or said optical delay.

21. An interference cancellation system according to claim 19, wherein said control subsystem comprises a closed loop control subsystem.

22. An interference cancellation system according to claim 21, wherein said closed loop control subsystem employs a dither method of feedback control.

23. An interference cancellation system according to claim 21, wherein said closed loop control subsystem employs a parameter offset method of feedback control.

24. An interference cancellation system according to claim 19, wherein said optical delay is connected to said second electro-optical modulator through said optical attenuator.

25. An interference cancellation system according to claim 19, further comprising:
an optical attenuator connected to said first electro-optic modulator; and
an optical delay connected to said first electro-optic modulator.

26. An interference cancellation system according to claim 19, wherein said electro-optic modulator comprises an interferometric optical modulator.

27. An interference cancellation system according to claim 26, where said interferometric modulator comprises a Mach-Zehnder optical modulator.

28. An interference cancellation system according to claim 19, further comprising:
a first laser serving as an input to said first electro-optic modulator; and
a second laser serving as an input to said second electro-optic modulator.

29. An interference cancellation system according to claim 19, wherein said first laser operates at a different wavelength than said second laser.

30. An interference mitigation system comprising:
a transmitter, wherein said transmitter is transmitting a strong signal;
a receiver in close proximity to said transmitter, said receiver comprising an output connected to an optical cancellation system and wherein said receiver is capable of receiving a weak signal;
a splitter connected to said transmitter, said splitter comprising an output connected to said optical cancellation system;
said optical cancellation system comprising:
a first electro-optic modulator connected to said splitter, said first electro-optic modulator configured to modulate said strong signal;
a combiner in communication with said splitter and said receiver, wherein said combiner is configured to combine said strong signal and said weak signal into a combined signal;
a second electro-optic modulator connected to said combiner, wherein said second electro-optic modulator is configured to modulate said combined signal, and wherein said first and second electro-optic modulators are biased for parallel counter-phase modulation;
an optical attenuator connected to said second electro-optic modulator;
an optical delay connected to said second electro-optic modulator; and
an optical coupler connected to said first and second electro-optic modulators, said second electro-optic modulator being connected to said optical coupler through said optical attenuator and said optical delay.

31. An interference cancellation system according to claim 30, further comprising an control subsystem for automatically controlling said optical attenuator and/or said optical delay.

32. An interference cancellation system according to claim 30, wherein said control subsystem comprises an open loop control subsystem.

33. An interference cancellation system according to claim 30, wherein said control subsystem comprises a closed loop control subsystem.

34. An interference cancellation system according to claim 33, wherein said closed loop control subsystem employs a dither method of feedback control.

35. An interference cancellation system according to claim 33, wherein said closed loop control subsystem employs a parameter offset method of feedback control.

36. An interference cancellation system comprising:
a first electro-optic modulator for receiving a first signal;
a second electro-optical modulator for receiving a second signal together with said first signal, said first and second electro-optical modulators being biased for parallel counter-phase modulation;
an optical attenuator connected to said second electro-optical modulator;
an optical delay connected to said second electro-optical modulator; and
an optical coupler connected to said first and second electro-optical modulators, wherein said first electro-optical modulator is connected directly to said optical coupler and said second electro-optic modulator is connected to said optical coupler through said optical attenuator and said optical delay.

* * * * *